(12) United States Patent
Silverstein et al.

(10) Patent No.: US 10,200,596 B1
(45) Date of Patent: Feb. 5, 2019

(54) DYNAMIC OPTICAL SHIFT/TILT LENS

(71) Applicant: Apple Inc., Cupertino, CA (US)

(72) Inventors: Brian M. Silverstein, San Carlos, CA (US); D. Amnon Silverstein, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/042,970

(22) Filed: Jul. 23, 2018

Related U.S. Application Data

(63) Continuation of application No. 14/941,309, filed on Nov. 13, 2015, now Pat. No. 10,033,917.

(51) Int. Cl.
*H04N 5/232* (2006.01)
*G02B 27/00* (2006.01)
*G02B 27/64* (2006.01)

(52) U.S. Cl.
CPC ..... *H04N 5/23212* (2013.01); *G02B 27/0075* (2013.01); *G02B 27/646* (2013.01)

(58) Field of Classification Search
None
See application file for complete search history.

(56) References Cited

U.S. PATENT DOCUMENTS

| | | | |
|---|---|---|---|
| 8,989,447 B2 | 3/2015 | Sezer | |
| 10,033,917 B1 | 7/2018 | Silverstein et al. | |
| 2008/0037972 A1 | 2/2008 | Takeda et al. | |
| 2009/0086050 A1 | 4/2009 | Kasakawa | |
| 2013/0113984 A1 | 5/2013 | Shimamoto et al. | |
| 2013/0342750 A1 | 12/2013 | Foote | |
| 2014/0002606 A1 | 1/2014 | Blayvas et al. | |
| 2014/0009631 A1 | 1/2014 | Topliss | |
| 2014/0267941 A1 | 9/2014 | Ellsworth | |
| 2014/0313288 A1 | 10/2014 | Dai et al. | |
| 2015/0212336 A1 | 7/2015 | Hubert et al. | |
| 2015/0288870 A1 | 10/2015 | Nagaraja et al. | |
| 2015/0296149 A1 | 10/2015 | Laroia | |

FOREIGN PATENT DOCUMENTS

CN 103246131 8/2013

*Primary Examiner* — Paul M Berardesca
(74) *Attorney, Agent, or Firm* — Robert C. Kowert; Meyertons, Hood, Kivlin, Kowert & Goetzel, P.C.

(57) ABSTRACT

Camera modules that may be dynamically adjusted during capture of an image. The camera may include a sensor that captures images using line scan imaging or other scanning technologies. A controller may dynamically control adjustment or movement of the camera lens by an actuator as an image is scanned by the sensor. The lens may be controlled to be in different positions and in different orientations in relation to the sensor as different lines or areas of pixels of the sensor are read. When capturing an image, a region of the sensor may be read, the lens may be adjusted, and a next region of the sensor may be read according to a pattern. Different focus, depth of field, perspective, and other effects may be achieved at different areas or regions of the image during image capture.

20 Claims, 16 Drawing Sheets

DYNAMIC OPTICAL SHIFT/TILT LENS

This application is a continuation of U.S. patent application Ser. No. 14/941,309, filed Nov. 13, 2015, now U.S. Pat. No. 10,033,917, which is hereby incorporated by reference herein in its entirety.

BACKGROUND

Technical Field

This disclosure relates generally to camera systems, and more specifically to small form factor camera systems.

Description of the Related Art

The advent of small, mobile multipurpose devices such as smartphones and tablet or pad devices has resulted in a need for high-resolution, small form factor cameras for integration in the devices. However, due to limitations of conventional camera technology, conventional small cameras used in such devices tend to capture images at lower resolutions and/or with lower image quality than can be achieved with larger, higher quality cameras. Achieving higher resolution with small package size cameras generally requires use of a photosensor with small pixel size and a good, compact imaging lens system. Advances in technology have achieved reduction of the pixel size in photosensors. However, as photosensors become more compact and powerful, demand for compact imaging lens system with improved imaging quality performance has increased.

Some small form factor cameras may incorporate mechanisms whereby the object focal distance can be adjusted to focus a subject plane or field in front of the camera at an image plane to be captured by an image sensor (also referred to herein as a photosensor). For example, in some such focusing mechanisms, the lens system is moved as a single rigid body along the optical axis (referred to as the Z axis) of the camera to refocus the camera. In addition, in some such cameras, optical effects or functionality such as optical image stabilization (OIS) can be achieved by moving the lens system in other degrees of freedom, for example on one or more axes (e.g., X and Y) orthogonal to the optical (Z) axis of the camera. However, in conventional cameras with such mechanisms, the lens system is adjusted on one or more axes prior to capturing an image, for example according to a preview image, and remains set or stationary during actual capture of the image.

SUMMARY OF EMBODIMENTS

Embodiments of methods and apparatus are described that may dynamically adjust the lens system of a camera when capturing images of subject fields to achieve different optical effects in different regions of the captured images. Embodiments may provide cameras (video or image cameras), specifically small form factor cameras suitable for use in mobile devices, with lenses or lens systems that may be dynamically adjusted during capture of an image. In embodiments, an actuator mechanism of the camera may be configured to adjust the lens of the camera, for example to move the lens on the optical (Z) axis to change focus of the camera, to move the lens on one or more axes orthogonal to the Z axis, and to tilt the lens relative to the image sensor. The camera may include a sensor that captures images of scenes in front of the camera refracted through the lens system using line scan imaging technology or other scanning technologies (e.g., area scan), for example a CMOS (complementary metal-oxide semiconductor) image sensor using "rolling shutter" technology that reads lines of pixels from top to bottom of the sensor, or a CCD (charge-coupled device) image sensor that incorporates scan technology. In some embodiments, other scan patterns than top to bottom may be provided by the sensor technology, for example a left to right pattern, diagonal patterns, or spiral patterns from the center to the outer edges of the center of the sensor.

Embodiments of a camera system as described herein may include a controller component configured to dynamically control adjustment or movement of the lens system by the actuator as an image is scanned by the sensor (referred to herein as an image capture) according to the pattern. Thus, unlike conventional cameras in which the lens system is adjusted prior to capturing an image and remains set or stationary during actual capture of the image, the lens may be controlled to be in different positions (Z and/or X-Y) and in different orientations (tilt) in relation to the sensor as different lines or areas of pixels of the sensor are read. When capturing an image, a region of the sensor may be read, the lens system may be adjusted, and a next region of the sensor may be read according to the pattern. Thus, different focus, depth of field, perspective, and other effects may be dynamically achieved during image capture at different areas or regions of the image being captured.

In some embodiments, an interface may be provided on a device (e.g., a mobile device) in which the camera system is integrated via which a user may specify (e.g., using touch control on a touch-enabled screen that displays an image preview) particular parts of the image to be in focus, focus range for the specified areas, different perspectives for different parts of the image, and so on.

In some embodiments, the controller may obtain camera position information from an accelerometer or similar technology of the device, for example to automatically adjust the lens system during image capture according to position of the camera relative to a horizontal or vertical plane.

In some embodiments, the controller may obtain and analyze autofocus information from the camera (e.g., autofocus pixels from an image preview), for example to automatically adjust the lens system according to position of the camera relative to a subject field or scene during image capture.

Figure 1A:
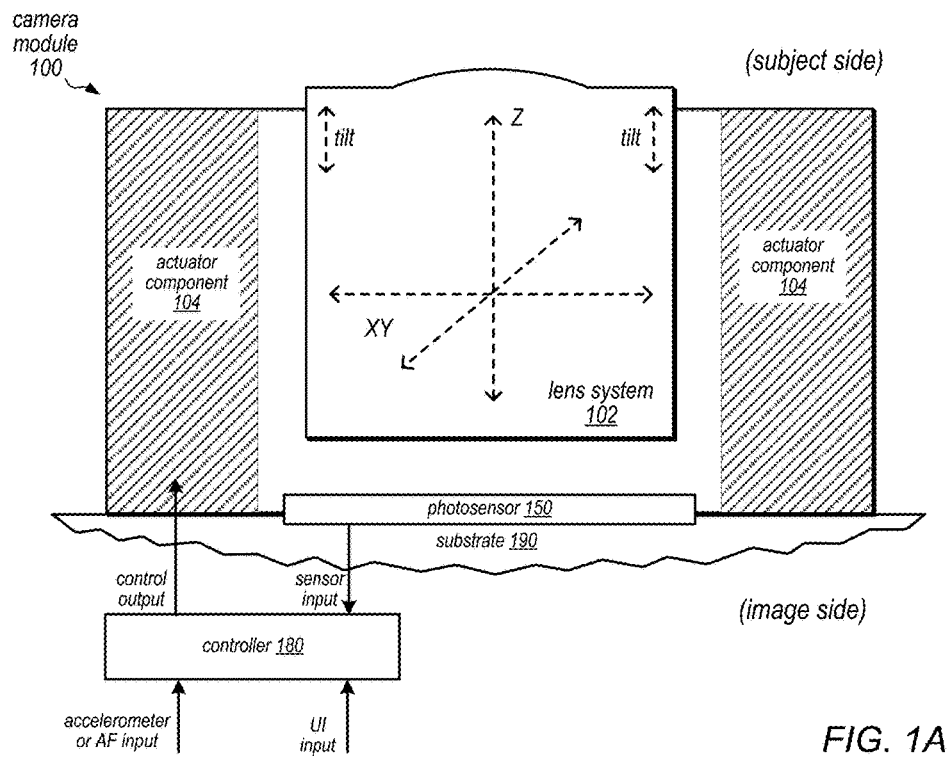
FIGS. 1A and 1B illustrate movement of a lens system by an actuator mechanism to provide focusing or other optical effects for different regions of an image during image capture, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ". Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Embodiments of methods and apparatus are described that may dynamically adjust the lens system of a camera (a video or image camera) when capturing images of subject fields to achieve different optical effects in different regions of the captured images. Embodiments may provide camera systems (video or image cameras), specifically small form factor cameras suitable for use in mobile devices, with lenses or lens systems that may be dynamically adjusted during capture of an image. Embodiments of camera systems are described that may include a photosensor, a lens system, an actuator component configured to move or otherwise adjust the lens system, and a controller component configured to direct adjustment of the lens system by the actuator component during capture of the image by the photosensor to achieve different optical effects at different regions of the captured image. In addition, embodiments of removable lenses for cameras such as DSLR cameras may be implemented that include a lens system, an actuator component configured to move or otherwise adjust the lens system, and a controller component configured to direct adjustment of the lens system by the actuator component during capture of an image by a photosensor of the camera body to achieve different optical effects at different regions of the captured image.

Figure 3A:
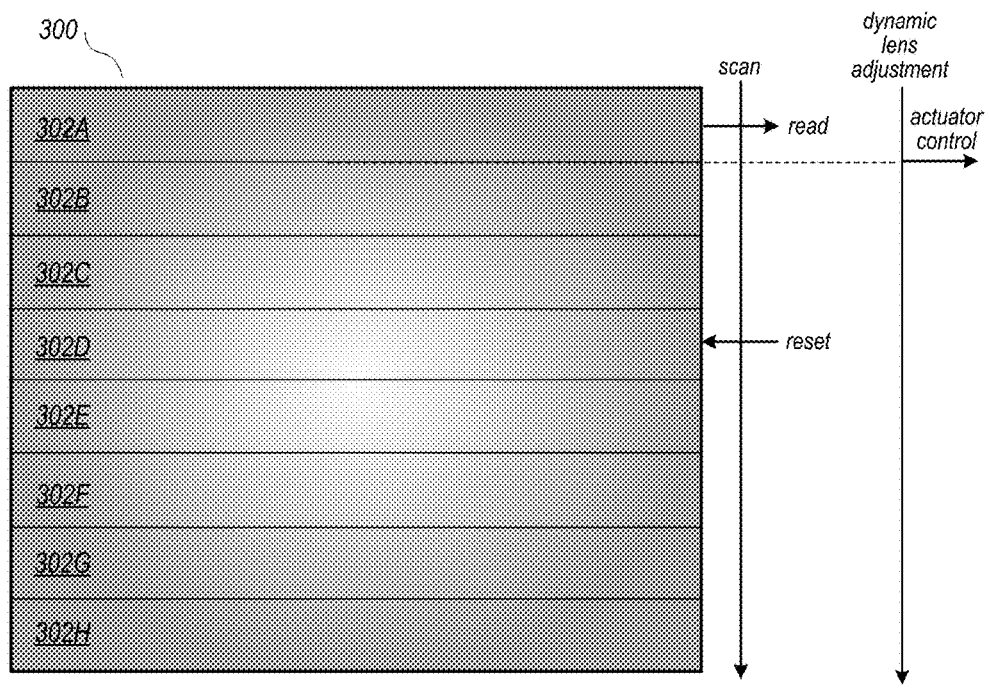
FIGS. 3A through 3C illustrate dynamically adjusting the lens system when reading regions or areas of pixels from a sensor during image capture, according to some embodiments.
Figure 3B:
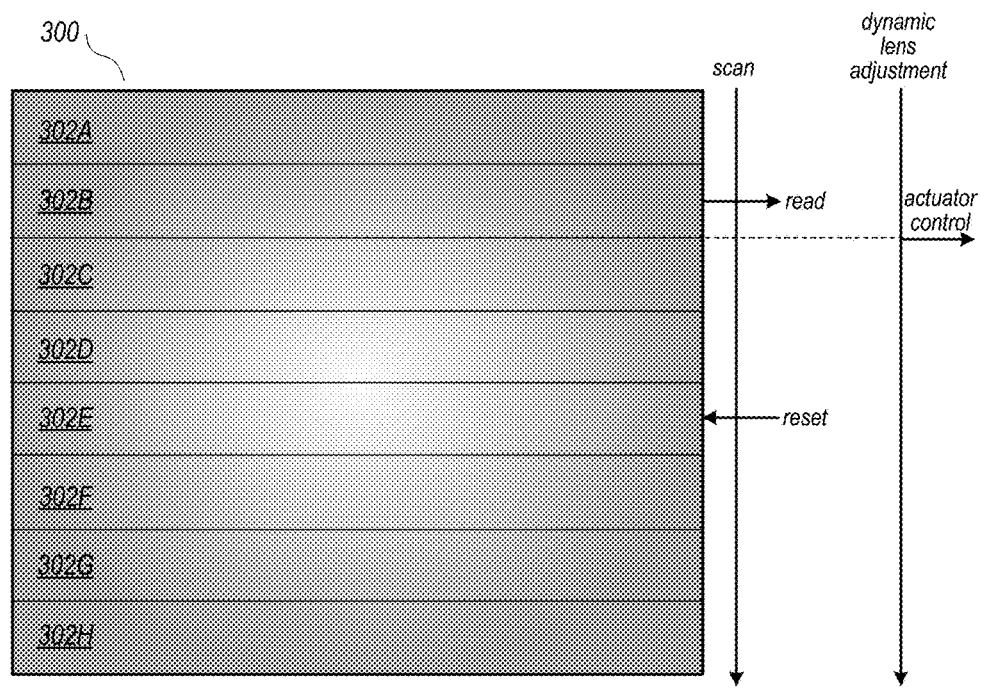
Figure 3C:
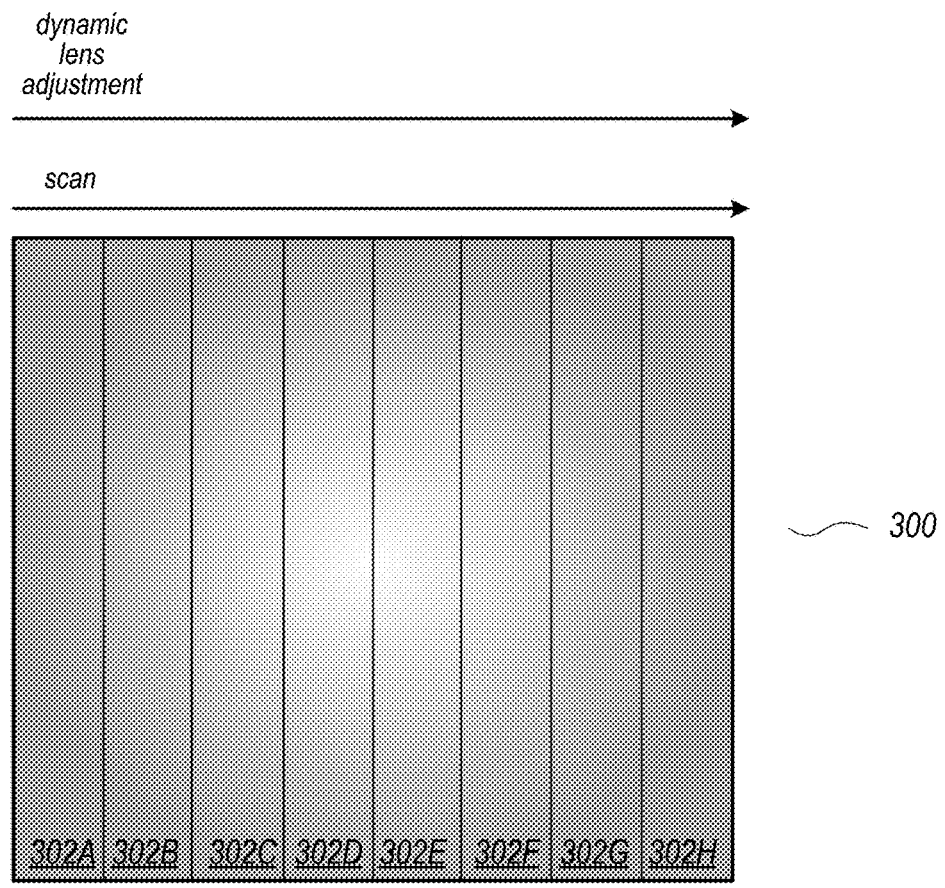

The photosensor may be configured to capture images of scenes or subject fields in front of the camera refracted through the lens system using line scan imaging technology or other scanning technologies (e.g., area scan), for example a CMOS (complementary metal-oxide semiconductor) image sensor using "rolling shutter" technology that reads lines of pixels from top to bottom of the sensor, or a CCD (charge-coupled device) image sensor that incorporates scan technology. In some embodiments, other scan patterns than top to bottom may be provided by the sensor technology, for example a left to right pattern, diagonal patterns, or spiral patterns from the center to the outer edges of the center of the sensor. FIGS. 3A through 3C illustrate an example photosensor that uses scanning technology to capture images.

Figure 1B:
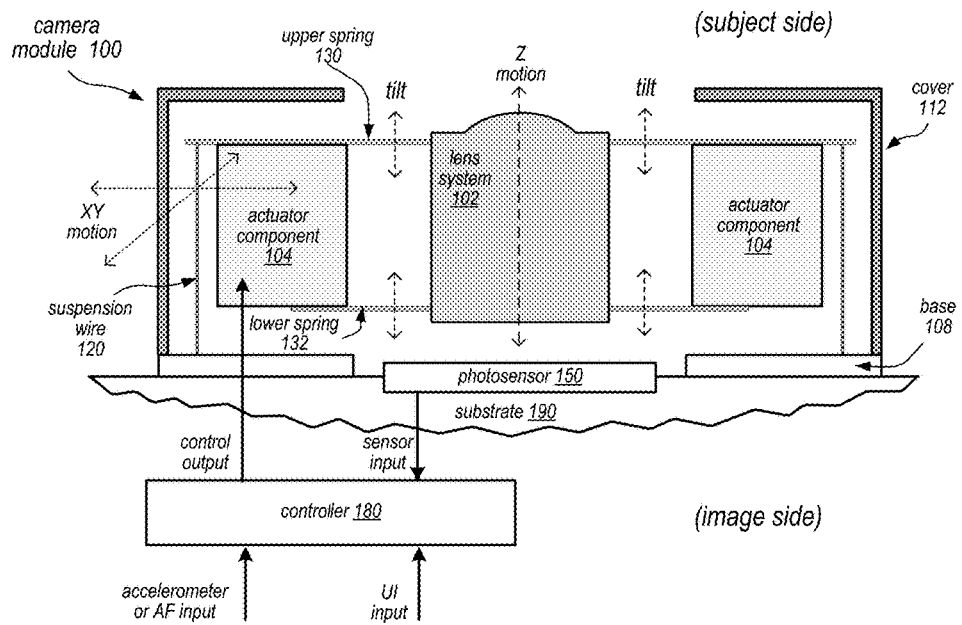
Figure 2A:
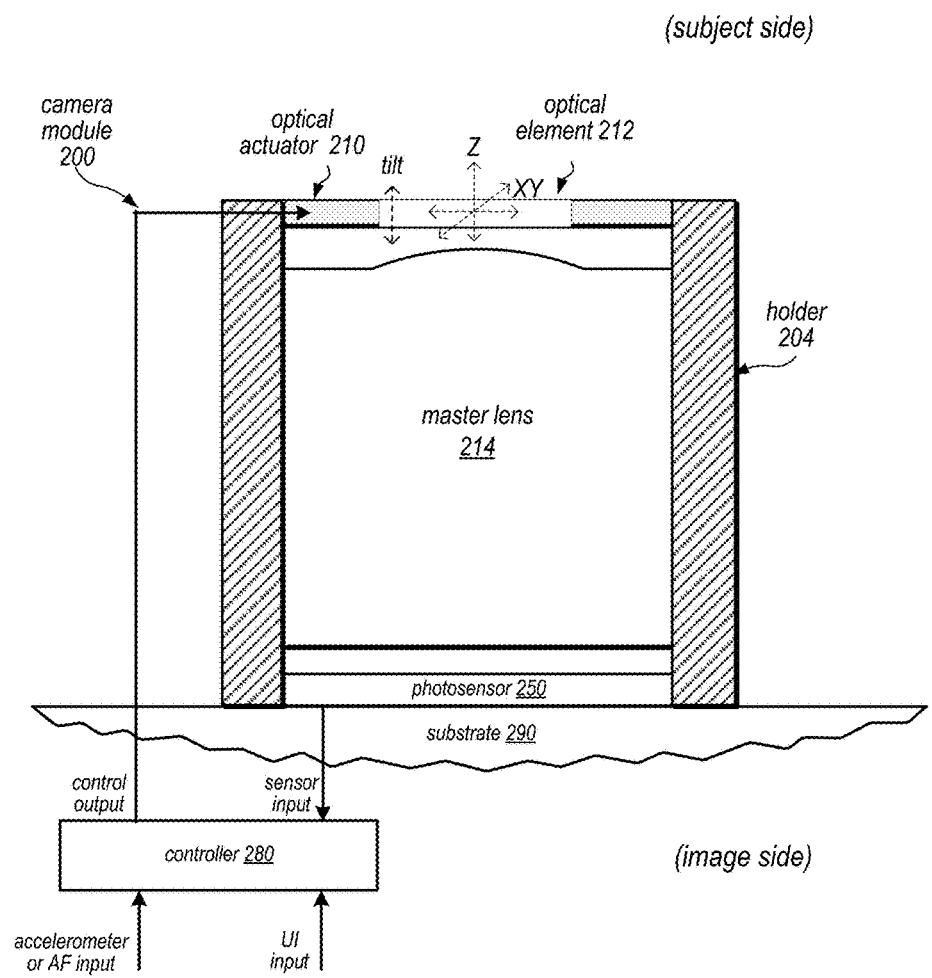
FIG. 2A illustrates a lens system including a fixed master lens and an optical actuator component that provides focusing or other optical effects for different regions of an image during image capture, according to some embodiments.
Figure 2B:
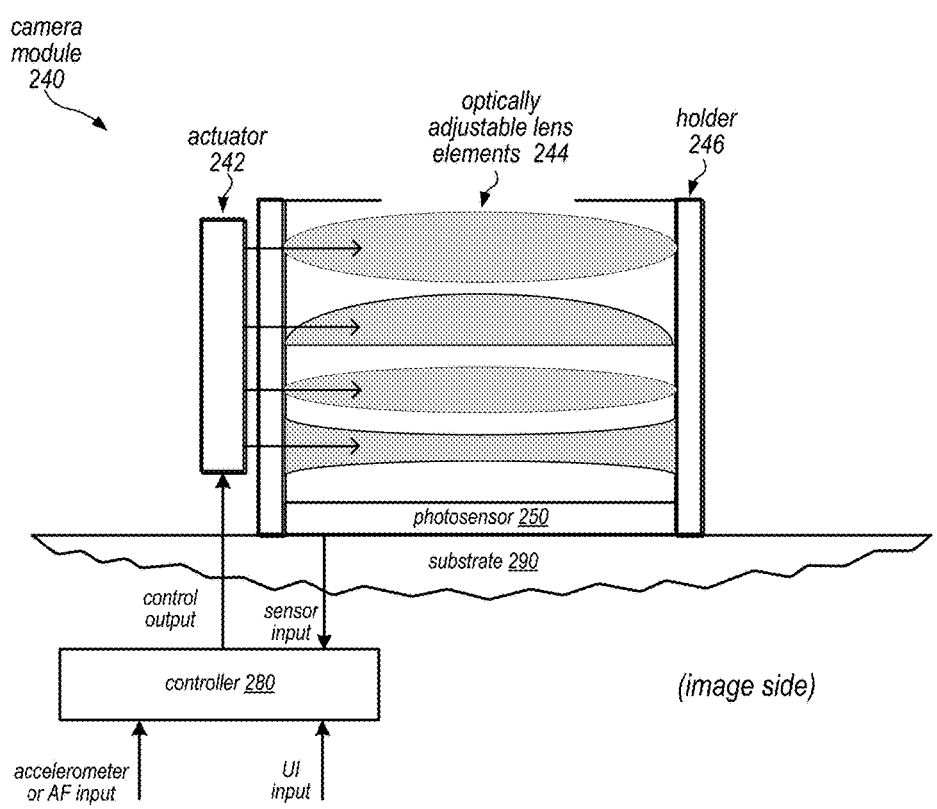
FIG. 2B illustrates an example lens system including one or more optically adjustable lens elements and an actuator component that provides focusing or other optical effects for different regions of an image during image capture, according to some embodiments.

In some embodiments, to achieve focusing, depth of field, perspective, and/or other optical effects in small form factor cameras, mechanical solutions that move or tilt the lens system in relation to the photosensor in the Z (optical axis) direction and/or moves the lens system on one or more axes orthogonal to the Z axis, may be used, for example as illustrated in FIGS. 1A and 1B. In some embodiments, for example, the actuator component may be a voice coil motor (VCM) technology component configured to move the lens system on the Z (optical) axis of the camera and/or on one or more axes orthogonal to the Z axis to provide adaptive optical functionality for the camera. Alternatively, in some embodiments, to achieve focusing, depth of field, perspective, and/or other optical effects in small form factor cameras, an optical actuator component that dynamically modifies one or more optical elements on the optical (Z) axis of the camera lens system may be used, for example as illustrated in FIGS. 2A and 2B. As an example, in some embodiments, the optical actuator component may be an optical microelectromechanical system (MEMS) configured to dynamically change the shape of a flexible optical element to provide adaptive optical functionality for the camera as shown in FIG. 2A. As another example, in some embodiments, the optical actuator component may be an actuator configured to dynamically change optical characteristics of one or more optically adjustable lens elements in the lens system such as liquid-crystal technology lenses, electrowetting technology lenses (referred to as "liquid lenses"), or electrochromic technology lenses to provide adaptive optical functionality for the camera as shown in FIG. 2B.

Embodiments of the camera system may include a controller component configured to dynamically control adjustment or movement of the lens system by the actuator as an image is scanned by the sensor (referred to herein as an image capture) according to the pattern. Thus, unlike conventional cameras in which the lens system is adjusted prior to capturing an image and remains set or stationary during actual capture of the image, the lens system may be controlled to be in different positions (Z and/or X-Y) and in different orientations (tilt) in relation to the sensor as different lines or areas of pixels of the sensor are read. When capturing an image, a region of the sensor may be read, the lens system may be adjusted, and a next region of the sensor may be read according to the pattern. Thus, different focus, depth of field, perspective, and other effects may be dynamically achieved during image capture at different areas or regions of the image being captured.

Figure 11:
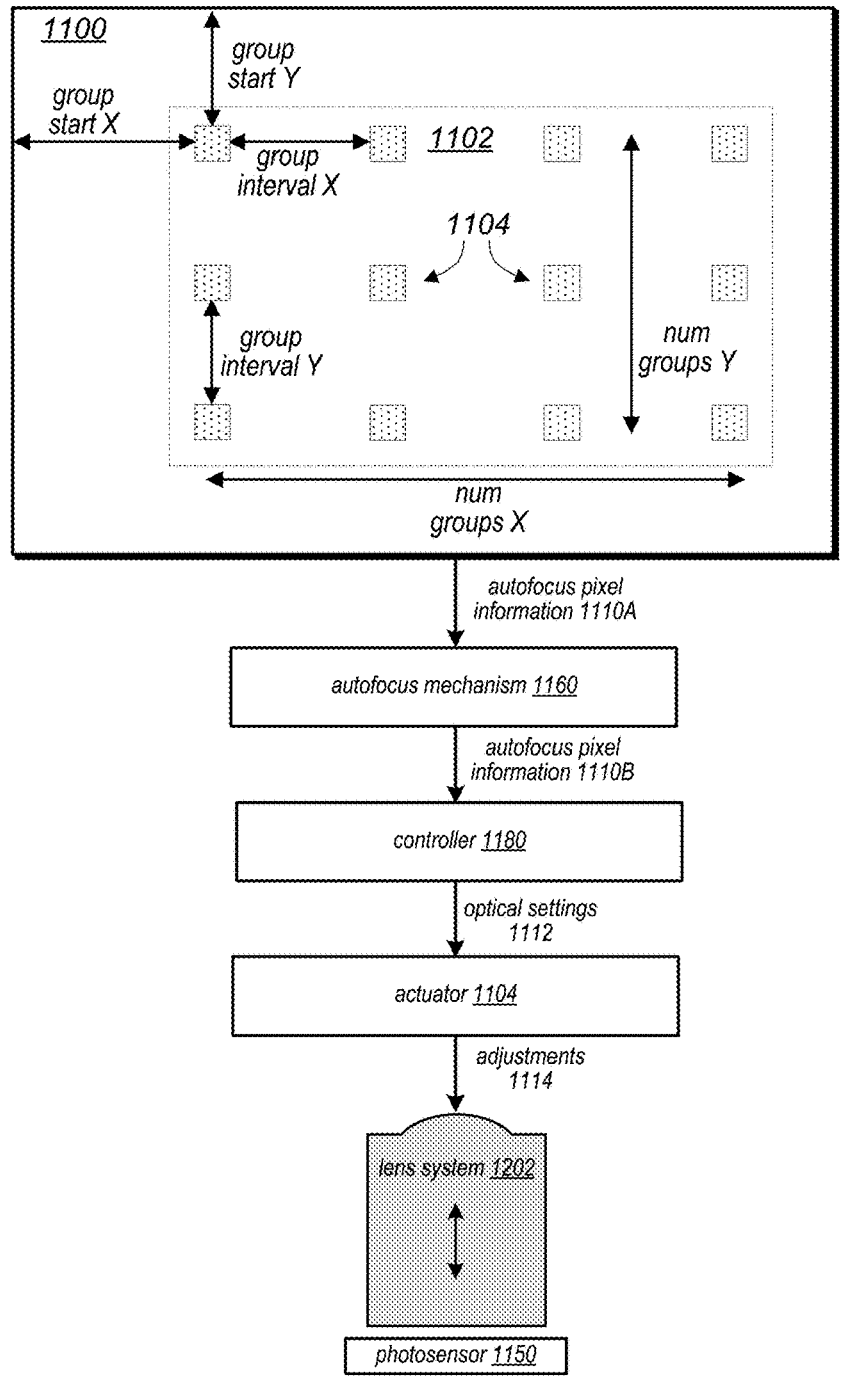
FIG. 11 illustrates using information derived from focus pixels to achieve different optical effects at different regions of an image during image capture, according to some embodiments.
Figure 12:
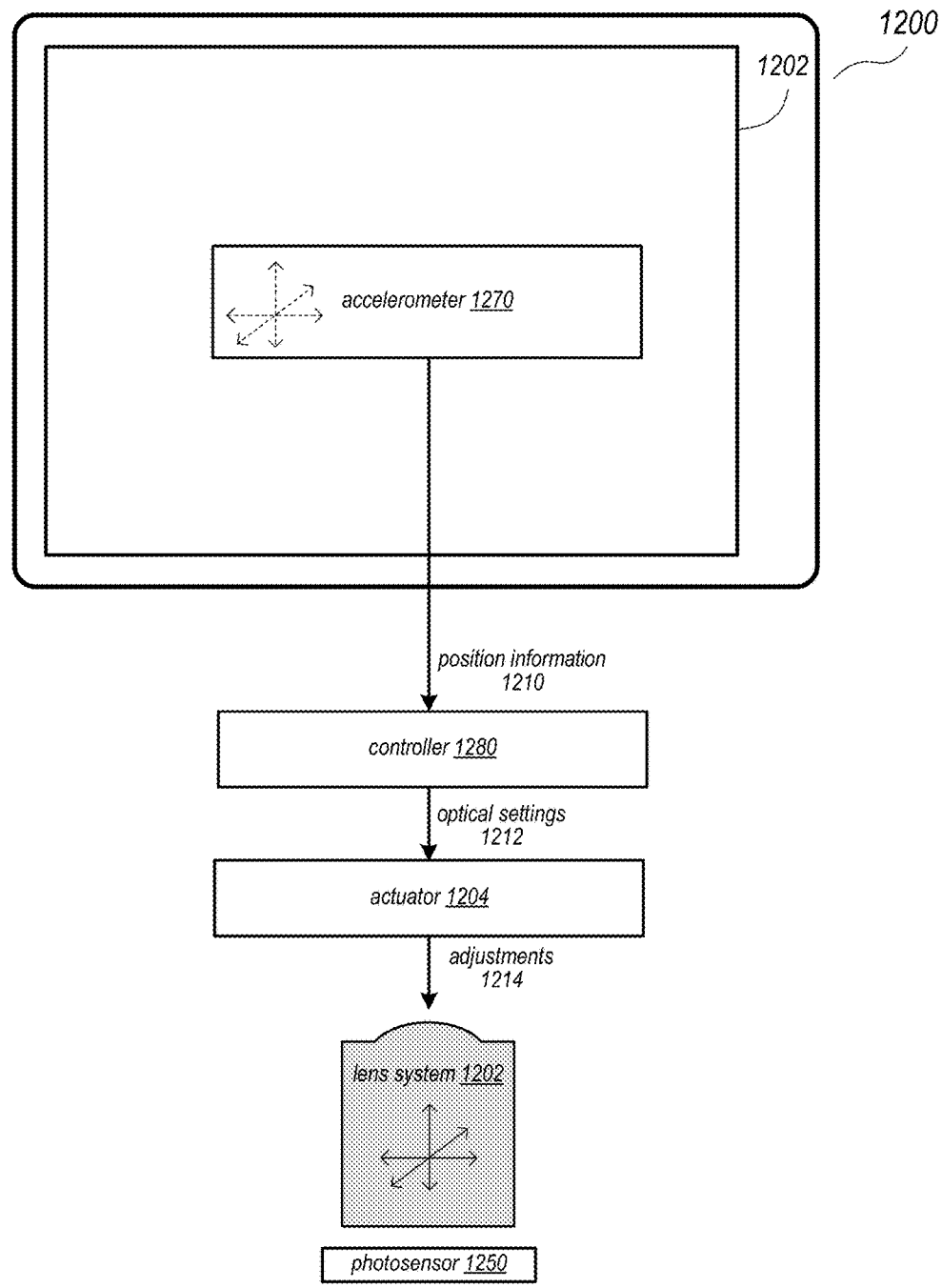
FIG. 12 illustrates using accelerometer information to achieve different optical effects at different regions of an image during image capture, according to some embodiments.

In some embodiments, an interface may be provided on a device (e.g., a mobile device) in which the camera system is integrated via which a user may specify (e.g., using touch control on a touch-enabled screen that displays an image preview) particular parts of the image to be in focus, focus range for the specified areas, different perspectives for different parts of the image, and so on. FIGS. 6A, 6B, 8A, 8B, 9A, and 9B illustrate example interfaces for selecting different optical effects for different regions of an image, according to some embodiments. In some embodiments, instead of or in addition to the interface for specifying parts of the image to be captured according to specified optical effects, the controller may be configured to obtain and analyze autofocus information from the camera (e.g., autofocus pixels from an image preview), for example to automatically adjust the lens system according to position of the camera relative to a subject field or scene during image capture. FIG. 11 illustrates using information derived from focus pixels to achieve different optical effects at different regions of an image during image capture, according to some embodiments. In some embodiments, the controller may instead or also be configured to obtain camera position information from an accelerometer or similar technology of the device, for example to automatically adjust the lens system during image capture according to position of the camera relative to a horizontal or vertical plane. FIG. 12 illustrates using accelerometer information to achieve different optical effects at different regions of an image during image capture, according to some embodiments.

Embodiments of the camera system as described herein may be implemented as a small form factor camera with a small package size suitable for use in small and/or mobile multipurpose devices such as cell phones, smartphones, pad or tablet computing devices, laptop, netbook, notebook, subnotebook, and ultrabook computers, and so on. However, note that aspects of the camera (e.g., the lens system and photosensor) may be scaled up or down to provide cameras with larger or smaller package sizes. In addition, embodiments may be implemented as stand-alone digital cameras. In addition to still (single frame capture) camera applications, embodiments of the camera system may be adapted for use in video camera applications. In some embodiments, a camera as described herein may be included in a device along with one or more other cameras such as a wider-field small format camera or a telephoto or narrow angle small format camera, which would for example allow the user to select between the different camera formats (e.g., normal, telephoto or wide-field) when capturing images with the device. In some embodiments, two or more small format cameras as described herein may be included in a device, for example as front-facing and rear-facing cameras in a mobile device. In addition, embodiments of removable lenses for cameras such as DSLR cameras may be implemented that include a lens system, an actuator component configured to move or otherwise adjust the lens system, and a controller component (either as a component of the removable lens or as a component of the camera) configured to direct adjustment of the lens system by the actuator component during capture of an image by a photosensor of the camera body to achieve different optical effects at different regions of the captured image.

FIGS. 1A and 1B illustrate movement of a lens system 102 within example camera modules 100 by a mechanical actuator 104 to provide focusing or other optical effects for different regions of an image during image capture, according to some embodiments. In some embodiments, to achieve focusing, depth of field, perspective, and/or other optical effects in cameras during image capture, a mechanical actuator 104, such as a voice coil motor (VCM) technology actuator, may be employed to move or tilt the lens system 102 in relation to the photosensor 150 on the Z (optical) axis and/or to displace the lens system 102 on one or more axes orthogonal to the optical axis.

FIG. 1A illustrates an actuator component 104 that mechanically moves a lens system 102 within an example camera module 100 to provide mechanical focusing, perspective adjustment, or other optical effects for the camera module 100. The camera module 100 may, for example, include a lens system 102, an actuator component 104, and a controller 180 component that directs the actuator component 104 to control motion of the lens system 102 within the camera module 100. The camera module 100 may, for example, be mounted to a substrate 190 that includes a photosensor 150 of the camera system 100.

The controller 180 component may, for example, be implemented at least in part as or by one or more processors. In some embodiments, the processor(s) may be programmed with software and/or firmware to provide the control functions for the actuator component 104 as described herein. While FIG. 1A show the controller 180 component as separate from the camera module 100, in various embodiments the controller 180 component may be a component of the camera module 100, a component of the actuator 104, or a separate component, for example one or more processors mounted on or integrated with the substrate 190.

The controller 180 and actuator 104 components of the camera module 100 may provide motion to lens system 102 on the Z (optical) axis, tilt of the lens system 102 relative to the Z axis, and/or displacement on one or more axes orthogonal to the Z axis in the XY plane. The XY plane motion may, for example, provide optical image stabilization (OIS) or other optical functionality by moving the lens system 102 on the X and/or Y axis relative to the photosensor 150, and may be applied for areas or regions of images being captured. The Z axis motion may, for example, provide different optical focusing for areas or regions of images being captured. by moving the lens system 102 on the Z axis relative to the photosensor 150 while the image is being captured by the photosensor 150. The tilt may, for example, provide adjustments of perspective or depth of field for areas or regions of images being captured, or for the entire image.

The photosensor 150 may be configured to capture images of scenes or subject fields in front of the camera system 100 refracted through the lens system 102 using line scan imaging technology or other scanning technologies (e.g., area scan), for example a CMOS image sensor using "rolling shutter" technology that reads lines of pixels from top to bottom of the sensor, or a CCD image sensor that incorporates scan technology. In some embodiments, other scan patterns than top to bottom may be provided by the sensor technology, for example a left to right pattern, diagonal patterns, or spiral patterns from the center to the outer edges of the center of the sensor. FIGS. 3A through 3C illustrate an example photosensor that uses scanning technology to capture images.

The actuator component 104 may provide focusing, depth of field, perspective, and/or other optical effects by moving or tilting the lens system 102 in relation to the photosensor 150 in the Z (optical axis) direction and/or by moving the lens system 102 on one or more axes orthogonal to the Z axis. In some embodiments, the actuator component 104 may include VCM technology, for example as illustrated in FIG. 1B. The controller 180 component may be programmed or configured to dynamically control adjustment or movement of the lens system 102 by the actuator 104 as areas or regions of an image are read by the photosensor 150 according to a scan pattern. Thus, unlike conventional cameras in which the lens system is adjusted prior to capturing an image and remains set or stationary during actual capture of the image, the lens system 102 may be controlled by the actuator 104 and controller 180 components to be in different positions (Z and/or X-Y) and in different orientations (tilt) in relation to the photosensor 150 as different lines, regions, or areas of pixels of the photosensor 150 are read when capturing an image. When capturing an image, a region of the photosensor 150 may be read, the lens system 102 may be adjusted by the actuator 104 under direction of the controller 180, and a next region of the photosensor 150 may be read according to the pattern (e.g., top to bottom, right to left, etc.). Thus, different focus, depth of field, perspective, and other effects may be dynamically achieved during image capture at different areas or regions of the image being captured.

Figure 10:
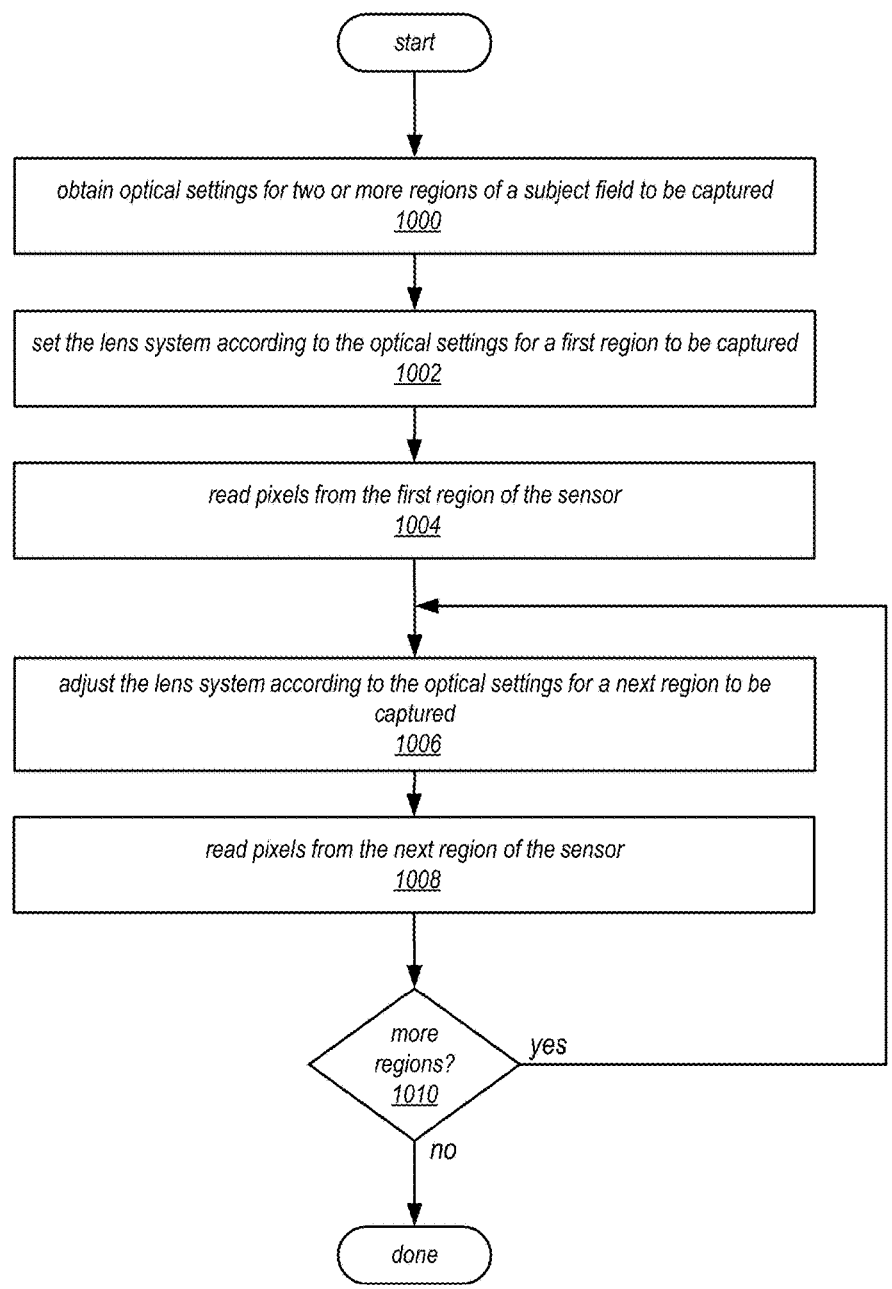
FIG. 10 is a flowchart of a method for adjusting the lens system when capturing images of subject fields to achieve different optical effects in different regions of the images, according to some embodiments.

As shown in FIG. 1A, the controller 180 component may obtain or receive input from one or more sources, and may use the input to generate control output to the actuator component 104 to direct the actuator component 104 in moving the lens system 102 during capture of an image by the photosensor 150. For example, the controller 180 component may obtain inputs or signals from the photosensor 150 when areas or regions of the photosensor 150 are being read or have been read during a scan that are used to coordinate movement of the lens system 102 with respect to the photosensor 150 during the scan. FIGS. 3A through 3C graphically illustrate coordinating movement of a lens system 102 with reading areas or regions of pixels from a photosensor 150 that uses scanning technology to capture images. FIG. 10 is a flowchart of an example method for moving a lens system 102 when capturing different areas or regions of pixels on a photosensor 150 that uses scanning technology.

In some embodiments, an interface may be provided on a device (e.g., a mobile device) in which the camera system 100 is integrated via which a user may specify (e.g., using touch control on a touch-enabled screen that displays an image preview) particular parts of the image to be in focus, focus range for the specified areas, different perspectives for different parts of the image, and so on, and the UI inputs may be provided to the controller 180 component. FIGS. 6A, 6B, 8A, and 8B illustrate example interfaces for selecting different optical effects for different regions of an image, according to some embodiments.

In some embodiments, the controller 180 component may obtain autofocus (AF) input from the camera system 100 (e.g., pixel information from autofocus pixels from an image preview), and may, for example, analyze the AF input to generate control outputs to automatically adjust the lens system 102 according to position of the camera system 100 relative to a subject field or scene during image capture. FIG. 11 illustrates using information derived from focus pixels to achieve different optical effects at different regions of an image during image capture, according to some embodiments.

In some embodiments, the controller 180 component may obtain device or camera position input from an accelerometer or similar technology of the device, and may analyze the position input to generate control outputs to automatically adjust the lens system 102 during image capture according to position of the camera system 100 relative to a horizontal or vertical plane, for example a tabletop or wall. FIG. 12 illustrates using accelerometer information to achieve different optical effects at different regions of an image during image capture, according to some embodiments.

FIG. 1B illustrates components of an example camera module 100 that provides Z, XY, and tilt motions for a lens system 102 during image capture, according to some embodiments. In this example, the camera module 100 may include a lens system 102 that is coupled to an actuator component 104 by upper and/or lower springs 130 and 132. In some embodiments, the lens system 102 may include a lens barrel that includes a stack of lens elements and a lens barrel holder. The subject side of the lens system 102 may be oriented to the top or upper side or surface of the camera module 100, while the image side of the lens system 102 may be oriented the bottom or lower side or surface of the camera module 100. The actuator component 104 may, for example, be a voice coil motor (VCM mechanism that uses magnets to control movement of the lens system 102 relative to the photosensor 150. The springs 130 and 132 may be flexible to allow motion and tilt of the lens system 102 on the Z axis relative to the photosensor 150. The actuator component 104 may, for example, be configured to move or tilt the lens system 102 on the Z axis within the camera module 100 and relative to the photosensor 150 to provide focusing or perspective adjustment functionality for the camera system 100. To tilt the lens system 102, the actuator 104 may cause one side of the lens system 102 to be raised or lowered so that the lens system 102 is at an angle relative to the photosensor 104, or alternatively may lower one side and raise another side of the lens system 102.

An assembly which includes at least the lens system 102, actuator component 104, and springs 130 and 132 may be suspended within the camera module 100 on two or more suspension wires 120. For example, the suspension wires 120 may be mounted to base 108, and the assembly may be suspended on the wires 120 at the outer portion of the upper springs 130. The suspension wires 120 may be flexible to allow motion of the lens system 102 on one or more axes (e.g., the X and Y axes) orthogonal to the Z (optical) axis of the lens system 102. The actuator component 102 may, for example, be configured to move the lens system 102 on the XY axes within the camera module 100 and relative to the photosensor 150 to provide optical image stabilization (OIS) or other optical functionality for the camera module 100. A cover 112 for the assembly may be attached to the base 108 of the actuator module 104. The assembled camera module 100 may, for example, be mounted to a substrate 190 that includes a photosensor 150 of the camera.

The camera system 100 may include or more be coupled to a controller 180 component that directs the actuator component 104 to control motion of the lens system 102 within the camera module 100. The controller 180 component may, for example, be implemented at least in part as or by one or more processors. In some embodiments, the processor(s) may be programmed with software and/or firmware to provide the control functions for the actuator component 104 as described herein. While FIG. 1B show the controller 180 component as separate from the camera module 100, in various embodiments the controller 180 component may be a component of the camera module 100, a component of the actuator 104, or a separate component, for example one or more processors mounted on or integrated with the substrate 190.

The controller 180 and actuator 104 components of the camera module 100 may provide motion to lens system 102 on the Z (optical) axis, tilt of the lens system 102 relative to the Z axis, and/or displacement on one or more axes orthogonal to the Z axis in the XY plane. The XY plane motion may, for example, provide optical image stabilization (OIS) or other optical functionality by moving the lens system 102 on the X and/or Y axis relative to the photosensor 150, and may be applied for specific areas or regions of images being captured. The Z axis motion may, for example, provide different optical focusing for areas or regions of images being captured. by moving the lens system 102 on the Z axis relative to the photosensor 150 while the image is being captured by the photosensor 150. The tilt may, for example, provide adjustments of perspective or depth of field for areas or regions of images being captured, or for the entire image.

The photosensor 150 may be configured to capture images of scenes or subject fields in front of the camera system 100 refracted through the lens system 102 using line scan imaging technology or other scanning technologies (e.g., area scan), for example a CMOS image sensor using "rolling shutter" technology that reads lines of pixels from top to bottom of the sensor, or a CCD image sensor that incorporates scan technology. In some embodiments, other scan patterns than top to bottom may be provided by the sensor technology, for example a left to right pattern, diagonal patterns, or spiral patterns from the center to the outer edges of the center of the sensor. FIGS. 3A through 3C illustrate an example photosensor that uses scanning technology to capture images.

The actuator component 104 may provide focusing, depth of field, perspective, and/or other optical effects by moving or tilting the lens system 102 in relation to the photosensor 150 in the Z (optical axis) direction and/or by moving the lens system 102 on one or more axes orthogonal to the Z axis. The controller 180 component may be programmed or configured to dynamically control adjustment or movement of the lens system 102 by the actuator 104 as areas or regions of an image are read by the photosensor 150 according to a scan pattern. Thus, unlike conventional cameras in which the lens system is adjusted prior to capturing an image and remains set or stationary during actual capture of the image, the lens system 102 may be controlled by the actuator 104 and controller 180 components to be in different positions (Z and/or X-Y) and in different orientations (tilt) in relation to the photosensor 150 as different lines, regions, or areas of pixels of the photosensor 150 are read when capturing an image. When capturing an image, a region of the photosensor 150 may be read, the lens system 102 may be adjusted by the actuator 104 under direction of the controller 180, and a next region of the photosensor 150 may be read according to the pattern (e.g., top to bottom, right to left, etc.). Thus, different focus, depth of field, perspective, and other effects may be dynamically achieved during image capture at different areas or regions of the image being captured.

As shown in FIG. 1B, the controller 180 component 180 may obtain or receive input from one or more sources, and may use the input to generate control output to the actuator component 104 to direct the actuator component 104 in moving the lens system 102 during capture of an image by the photosensor 150. For example, the controller 180 component may obtain inputs or signals from the photosensor 150 when areas or regions of the photosensor 150 are being read or have been read during a scan that are used to coordinate movement of the lens system 102 with respect to the photosensor 150 during the scan. FIGS. 3A through 3C graphically illustrate coordinating movement of a lens system 102 with reading areas or regions of pixels from a photosensor 150 that uses scanning technology to capture images. FIG. 10 is a flowchart of an example method for moving a lens system 102 when capturing different areas or regions of pixels on a photosensor 150 that uses scanning technology.

In some embodiments, an interface may be provided on a device (e.g., a mobile device) in which the camera system 100 is integrated via which a user may specify (e.g., using touch control on a touch-enabled screen that displays an image preview) particular parts of the image to be in focus, focus range for the specified areas, different perspectives for different parts of the image, and so on, and the UI inputs may be provided to the controller 180 component. FIGS. 6A, 6B, 8A, and 8B illustrate example interfaces for selecting different optical effects for different regions of an image, according to some embodiments.

In some embodiments, the controller 180 component may obtain and analyze autofocus (AF) input from the camera system 100 (e.g., pixel information from autofocus pixels from an image preview), and may, for example, analyze the AF input to generate control outputs to automatically adjust the lens system 102 according to position of the camera system 100 relative to a subject field or scene during image capture. FIG. 11 illustrates using information derived from focus pixels to achieve different optical effects at different regions of an image during image capture, according to some embodiments.

In some embodiments, the controller 180 component may obtain device or camera position input from an accelerometer or similar technology of the device, and may analyze the position input to generate control outputs to automatically adjust the lens system 102 during image capture according to position of the camera system 100 relative to a horizontal or vertical plane, for example a tabletop or wall. FIG. 12 illustrates using accelerometer information to achieve different optical effects at different regions of an image during image capture, according to some embodiments.

In addition to embodiments of a camera module 100 as illustrated in FIGS. 1A and 1B, embodiments of removable lenses for cameras such as DSLR cameras may be implemented that include a lens system 102, an actuator component 104, and a controller component 180 configured to direct adjustment of the lens system 102 by the actuator component 104 during capture of an image by a photosensor of the camera body to achieve different optical effects at different regions of the captured image.

In some embodiments, as an alternative to mechanical actuator components as illustrated in FIGS. 1A and 1B, an optical actuator component may be used that dynamically modifies one or more optical elements on the optical (Z) axis of the camera lens system may be used, for example as illustrated in FIGS. 2A and 2B.

FIG. 2A illustrates a camera module 200 that includes a lens system including a fixed master lens 214 and an optical actuator 210 component that may be used to provide focusing or other optical effects for different regions of an image during image capture, according to some embodiments. The lens system may include an optical actuator 210, for example an optical microelectromechanical system (MEMS), and a master lens 214 including one or more refractive lens elements, also referred to as a lens stack. The master lens 214 may be mounted or affixed inside a holder 204; the holder 204 and master lens 214 assembly may collectively be referred to as a lens barrel. The optical actuator 210 may be located on or within the holder 204 on the subject side of the master lens 214 in front of a first lens of the stack, while the photosensor 250 is located on the image side of the lens stack when the lens barrel is attached to a substrate 290 that holds the photosensor 250. In some embodiments, the optical actuator 210 may include, but is not limited to, a substrate (e.g., a clear glass or plastic substrate), an optical element 212 (e.g., a flexible lens), and an actuator component that is configured to change the shape of the optical element 212 to provide adaptive optical functionality for the camera module 100 without physically moving the lens barrel assembly; the master lens 214 and optical actuator 210 are fixed and stay stationary in the holder 204, and the assembly is fixed to the substrate 290. The focusing or other optical effects for different regions of an image during image capture may be provided by the optical actuator 210 changing the shape or other characteristics of the optical element 212 under control of a controller 280 component to affect light rays passing from the subject field through the optical element 212 to the master lens 214. For example, the optical element 212 may include a flexible membrane and a fluid (e.g., optical oil) in one or more cavities between the flexible membrane and the surface of the substrate 290. To change the shape of the flexible optical element 212, the actuator 210 may add or remove fluid from the cavity(s). Other lens technologies that allow optical characteristics of a lens to be dynamically changed may be used for optical element 212. For example, the optical element 212 may be a liquid-crystal technology lens, an electrowetting technology lens, or an electrochromic technology lens.

The camera module 200 may be coupled to a controller 280 component that directs the optical actuator 210 to control shape of the optical element 212 during image capture. The controller 280 component may, for example, be implemented at least in part as or by one or more processors. In some embodiments, the processor(s) may be programmed with software and/or firmware to provide the control functions for the optical actuator 210 as described herein. While FIG. 2A show the controller 280 component as separate from the camera module 200, in various embodiments the controller 280 component may be a component of the camera module 200, a component of the optical actuator 210, or a separate component, for example one or more processors mounted on or integrated with the substrate 290.

The photosensor 250 may be configured to capture images of scenes or subject fields in front of the camera system 200 refracted through the optical element 212 and master lens 214 using line scan imaging technology or other scanning technologies (e.g., area scan), for example a CMOS image sensor using "rolling shutter" technology that reads lines of pixels from top to bottom of the sensor, or a CCD image sensor that incorporates scan technology. In some embodiments, other scan patterns than top to bottom may be provided by the sensor technology, for example a left to right pattern, diagonal patterns, or spiral patterns from the center to the outer edges of the center of the sensor. FIGS. 3A through 3C illustrate an example photosensor that uses scanning technology to capture images.

The controller 280 and optical actuator 210 components of the camera module 200 may provide focusing, tilt, perspective or depth of field adjustment, or other optical effects for different regions of the image by dynamically adjusting the optical element 212 during image capture by the photosensor 250. The controller 280 component may be programmed or configured to dynamically control adjustment of the optical element 212 by the optical actuator 210 as areas or regions of an image are read by the photosensor 250 according to a scan pattern. Thus, unlike conventional cameras in which the lens system is adjusted prior to capturing an image and remains set or stationary during actual capture of the image, the optical element 212 may be adjusted by the optical actuator 210 and controller 280 components to be in shapes and thus to have different optical properties and provide different optical effects as different lines, regions, or areas of pixels of the photosensor 250 are read when capturing an image. When capturing an image, a region of the photosensor 250 may be read, the optical element 212 may be adjusted by the optical actuator 210 under direction of the controller 280, and a next region of the photosensor 250 may be read according to the pattern (e.g., top to bottom, right to left, etc.). Thus, different focus, depth of field, perspective, and other effects may be dynamically achieved during image capture at different areas or regions of the image being captured.

As shown in FIG. 2A, the controller 280 component may obtain or receive input from one or more sources, and may use the input to generate control output to the optical actuator 210 to direct the optical actuator 210 in adjusting the optical properties of the optical element 212 during capture of an image by the photosensor 250. For example, the controller 280 component may obtain inputs or signals from the photosensor 250 when areas or regions of the photosensor 250 are being read or have been read during a scan that are used to coordinate adjustment of the optical properties of the optical element 212 during the scan. FIGS. 3A through 3C graphically illustrate coordinating adjustment of the optical element 212 with reading areas or regions of pixels from a photosensor 250 that uses scanning technology to capture images. FIG. 10 is a flowchart of an example method for adjusting an optical element 212 to provide different optical properties when capturing different areas or regions of pixels on a photosensor 250 that uses scanning technology.

In some embodiments, an interface may be provided on a device (e.g., a mobile device) in which the camera system 200 is integrated via which a user may specify (e.g., using touch control on a touch-enabled screen that displays an image preview) particular parts of the image to be in focus, focus range for the specified areas, different perspectives for different parts of the image, and so on, and the UI inputs may be provided to the controller 280 component. FIGS. 6A, 6B, 8A, and 8B illustrate example interfaces for selecting different optical effects for different regions of an image, according to some embodiments.

In some embodiments, the controller 280 component may obtain and analyze autofocus (AF) input from the camera system 200 (e.g., pixel information from autofocus pixels from an image preview), and may, for example, analyze the AF input to generate control outputs to automatically adjust the optical element 212 according to position of the camera system 200 relative to a subject field or scene during image capture. FIG. 11 illustrates using information derived from focus pixels to achieve different optical effects at different regions of an image during image capture, according to some embodiments.

In some embodiments, the controller 280 component may obtain device or camera position input from an accelerometer or similar technology of the device, and may analyze the position input to generate control outputs to automatically adjust the optical element 212 during image capture according to position of the camera system 200 relative to a horizontal or vertical plane, for example a tabletop or wall. FIG. 12 illustrates using accelerometer information to achieve different optical effects at different regions of an image during image capture, according to some embodiments.

FIG. 2B illustrates an example lens system including one or more optically adjustable lens elements 244 and an actuator 242 component that provides focusing or other optical effects for different regions of an image during image capture by dynamically adjusting optical characteristics of at least one of the one or more lens elements 244, according to some embodiments. Note that the number, position, and shape of the lens elements 244 are given by way of example, and are not intended to be limiting. In some embodiments, the optical actuator component may be an actuator 242 configured to dynamically change optical characteristics of one or more optically adjustable lens elements 244 in the lens system such as liquid-crystal technology lenses, electrowetting technology lenses (referred to as "liquid lenses"), or electrochromic technology lenses to provide adaptive optical functionality for the camera. An example liquid-crystal lens is composed of a liquid crystal (matter in a state that has properties between those of liquid and those of solid crystal) material that can be electronically tuned to adjust one or more optical characteristics of the lens. An example liquid lenses is composed of two liquids with different optical and conductive properties in a container (e.g., a tube) that is coated with a hydrophobic material; one or more optical characteristics of the lens may be adjusted by applying a voltage across the coating to decrease or increase its water repellency in a process called electrowetting. An example electrochromic lens is a lens formed of a solid material (e.g. a polymer) with optical characteristics than can be changed by applying a voltage to the material. Note that other technologies may be used for the optically adjustable lens elements, including but not limited to suspended particle, photochromic, and thermochromic technologies. Also note that, in some embodiments, in addition to one or more optically adjustable lens elements, the lens system may also include at least one lens element that is not an optically adjustable lens. As shown in FIG. 2B, the controller 280 component may obtain or receive input from one or more sources (e.g., from the photosensor 250, from a user interface of the device, and/or from an accelerometer or autofocus mechanism as described in reference to FIG. 2A), and may use the input to generate control output to the actuator 240 to direct the actuator 240 in adjusting the optical characteristics of one or more of the lens elements 244 in the lens system of the camera 240 during capture of an image by the photosensor 250.

In addition to embodiments of a camera module 200 as illustrated in FIGS. 2A and 2B, embodiments of removable lenses for cameras such as DSLR cameras may be implemented that include a lens system with one or more optically adjustable lens elements, an actuator component, and a controller component 280 configured to direct adjustment of the one or more lens elements by the actuator component during capture of an image by a photosensor of the camera body to achieve different optical effects at different regions of the captured image.

FIGS. 3A through 3C illustrate dynamically adjusting the lens system when reading regions or areas of pixels from an example photosensor 300 during image capture, according to some embodiments. FIGS. 3A through 3C illustrate an example photosensor 300 that employs a scanning technology to capture images of scenes or subject fields refracted onto a surface of the photosensor 300 by a lens system using line scan imaging technology or other scanning technologies (e.g., area scan). For example, photosensor 300 may be a CMOS technology image sensor using "rolling shutter" technology that reads lines of pixels from top to bottom, left to right, or in other patterns, or a CCD technology image sensor that incorporates scanning technology.

FIGS. 3A and 3B illustrate a scan pattern that reads lines or areas of an example CMOS photosensor 300 that uses "rolling shutter" technology in a horizontal pattern to scan the photosensor 300 from top to bottom to capture an image projected onto the photosensor 300 through the lens system of a camera. In this example, the photosensor 300 is divided into eight areas or regions 302A-302H, with each region including one or more horizontal lines of pixels. The rows of pixels are reset in sequence starting at the top. When a specified number (which may be 1, 2, or more) of rows of pixels of the photosensor 300 have been reset, the read process begins reading the rows of pixels starting at the top of the photosensor 300 and proceeding at the same speed as the reset to the bottom of the photosensor 300. The time between a row being reset and the row being read is the integration or exposure time.

A controller component, for example as illustrated in FIG. 1A, 1B, or 2, may direct an actuator component, for example as illustrated in FIG. 1A, 1B, or 2, to set the lens system to an initial optical setting for a first region 302A before the read process begins for the region 302A. As shown in FIG. 3A, when the last line in region 302A has been read, the controller component may direct an actuator component to set the lens system to a different optical setting for a second region 302B before the read process begins for the region 302B. As shown in FIG. 3B, when the last line in region 302B has been read, the controller component may direct the actuator component to set the lens system to a different optical setting for a third region 302C before the read process begins for the region 302C. This process may continue until all of the regions 302A-302H have been read.

FIG. 3C illustrates a scan pattern that reads columns or areas of an example CMOS photosensor 300 that uses "rolling shutter" technology in a vertical pattern to scan the photosensor 300 from left to right when capturing an image projected onto the photosensor 300 through the lens system of a camera. In this example, the photosensor 300 is divided into eight areas or regions 302A-302H, with each region including one or more vertical columns of pixels. The columns of pixels are reset in sequence starting at the left. When a specified number of columns of pixels of the photosensor 300 have been reset, the read process begins reading the columns of pixels starting at the left of the photosensor 300 and proceeding at the same speed as the reset to the right of the photosensor 300.

A controller component may direct an actuator component to set the lens system to an initial optical setting for a first region 302A before the read process begins for the region 302A. When the last column in region 302A has been read, the controller component may direct an actuator component to set the lens system to a different optical setting for a second region 302B before the read process begins for the region 302B. When the last column in region 302B has been read, the controller component may direct the actuator component to set the lens system to a different optical setting for a third region 302C before the read process begins for the region 302C. This process may continue until all of the regions 302A-302H have been read.

Figure 4A:
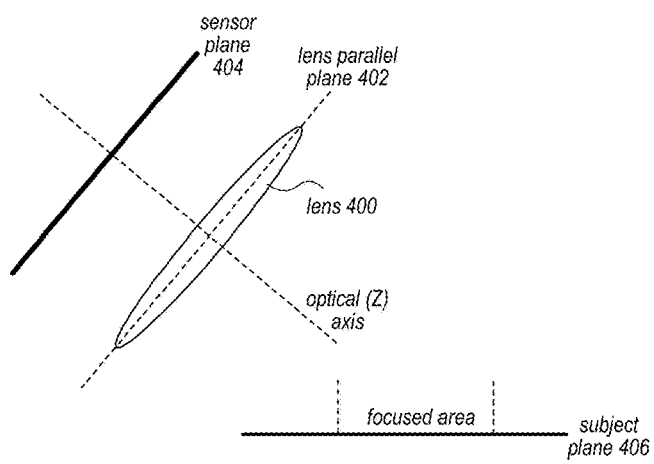
FIGS. 4A through 4C illustrate tilting a lens to achieve different focus effects for a camera during image capture, according to some embodiments.
Figure 4B:
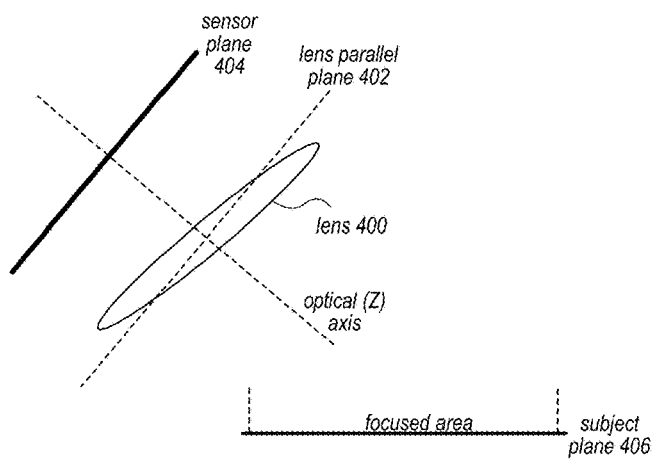
Figure 4C:
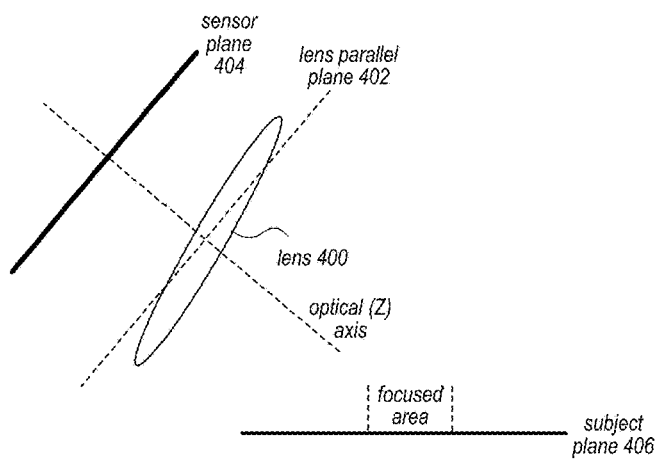

FIGS. 4A through 4C illustrate tilting a lens in a camera system, for example to achieve different focus effects such as depth of field for the camera during image capture, according to some embodiments. FIG. 4A shows a lens 400 that refracts light from a subject plane 406 to form an image at a sensor plane 404 of a camera. The subject plane 406 is not parallel with the sensor plane 404 of the camera, but is instead at some angle relative to the sensor plane 404. For example, the camera may be held by a photographer in the stand of a football stadium, and may be pointed at an angle down towards the field (the subject plane 406). The lens plane 402 is perpendicular to the optical axis of the camera; in other words, the lens 400 is not tilted relative to the sensor plane 404. In this configuration, the focused area of the subject plane 406 at the sensor plane 404, and thus the depth of field, is limited as shown in FIG. 4A because of the orientation of the lens 400 with respect to the subject plane 406.

To bring more or all of the subject plane 406 into focus, and thus to achieve greater depth of field, a controller component, for example as illustrated in FIG. 1A, 1B, or 2, may direct an actuator component, for example as illustrated in FIG. 1A, 1B, or 2, to tilt the lens 400 relative to the optical (Z) axis and the sensor plane 404 as illustrated in FIG. 4B. However, a photographer may want to narrow the focused area instead of widening the focused area. To narrow the focused area, the controller component may direct an actuator component to tilt the lens 400 relative to the optical (Z) axis and the sensor plane 404 as illustrated in FIG. 4C.

While FIGS. 4A through 4C show three separate tilt positions for a lens 400 when capturing an image as non-limiting examples, note that the controller component may direct the actuator component to tilt the lens 400 to other positions relative to the optical (Z) axis and the sensor plane 404 than those shown, and that the controller component may direct the actuator component to tilt the lens 400 to different positions to capture different regions of an image when scanning the image during an image capture, for example the different regions as illustrated in FIGS. 3A through 3C.

Figure 5:
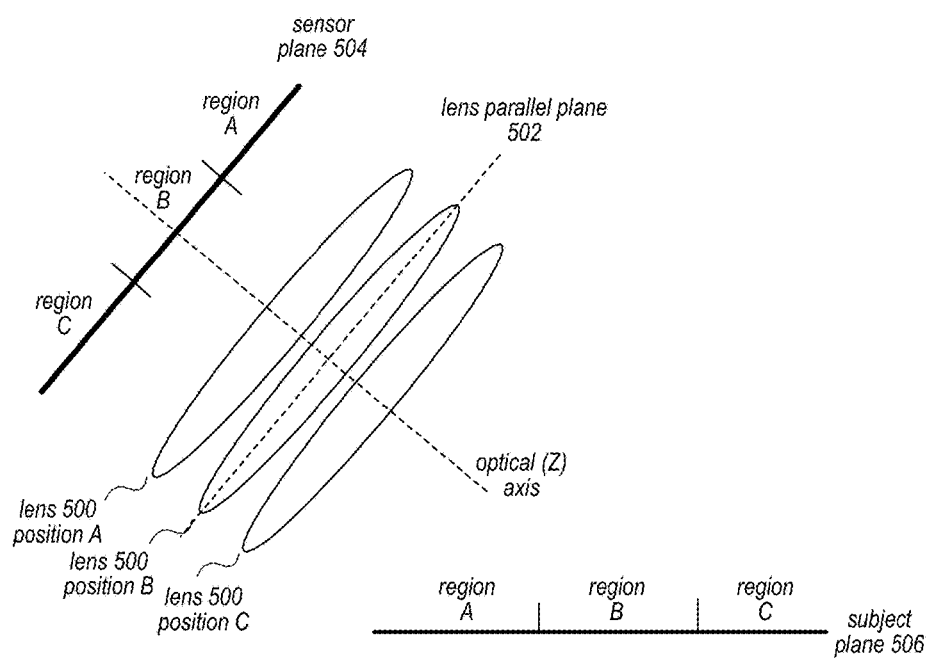
FIG. 5 illustrates moving a lens on the optical (Z) axis to achieve different focus for regions of an image during image capture, according to some embodiments.

FIG. 5 illustrates moving a lens on the optical (Z) axis of a camera system, for example to achieve different focus for different regions of an image during image capture, according to some embodiments. FIG. 5 shows a lens 500 that refracts light from a subject plane 506 to form an image at a sensor plane 504 of a camera. The subject plane 506 is not parallel with the sensor plane 504 of the camera, but is instead at some angle relative to the sensor plane 504. The lens plane 502 is perpendicular to the optical axis of the camera; in other words, the lens 400 is not tilted relative to the sensor plane 504.

In some embodiments, prior to beginning the read process when scanning the photosensor to capture an image of the subject plane 506 formed at the sensor plane 504 by the lens 500 as illustrated in FIGS. 3A and 3B, a controller component, for example as illustrated in FIG. 1A, 1B, or 2, may direct an actuator component, for example as illustrated in FIG. 1A, 1B, or 2, to move the lens 500 to a first focus position (A) on the optical (Z) axis. When the read process begins, lines of pixel data are first read from region A of the photosensor, which corresponds to region A of the subject plane 506. When the read of region A is complete, the controller component may direct the actuator component to move the lens 500 to a second focus position (B) on the optical axis. Lines of pixel data are then read from region B of the photosensor, which corresponds to region B of the subject plane 506. When the read of region B is complete, the controller component may direct the actuator component to move the lens 500 to a third focus position (C) on the optical axis. Lines of pixel data are then read from region C of the photosensor, which corresponds to region C of the subject plane 506. The three regions A through C are thus each captured with the lens 500 at a different focus position on the optical axis, and are thus captured at different focus levels.

While FIG. 5 shows three separate focus positions for a lens 500 when capturing an image as non-limiting examples, note that the controller component may direct the actuator component to move the lens 500 to other positions on the optical (Z) axis than those shown, and that the controller component may direct the actuator component to move the lens 400 to more or fewer positions to capture different regions of an image at different focus levels when scanning the image during an image capture, for example the different regions as illustrated in FIGS. 3A through 3C.

While FIGS. 4A through 4C illustrate tilting a lens system relative to the optical axis and FIG. 5 illustrates moving a lens system on the optical axis, in some embodiments the lens system may also be shifted on one or more axes orthogonal to the optical axis. Also note that various combinations of tilting, moving, and shifting of the lens system may be performed when capturing different regions of an image with the camera system as described herein.

Figure 6A:
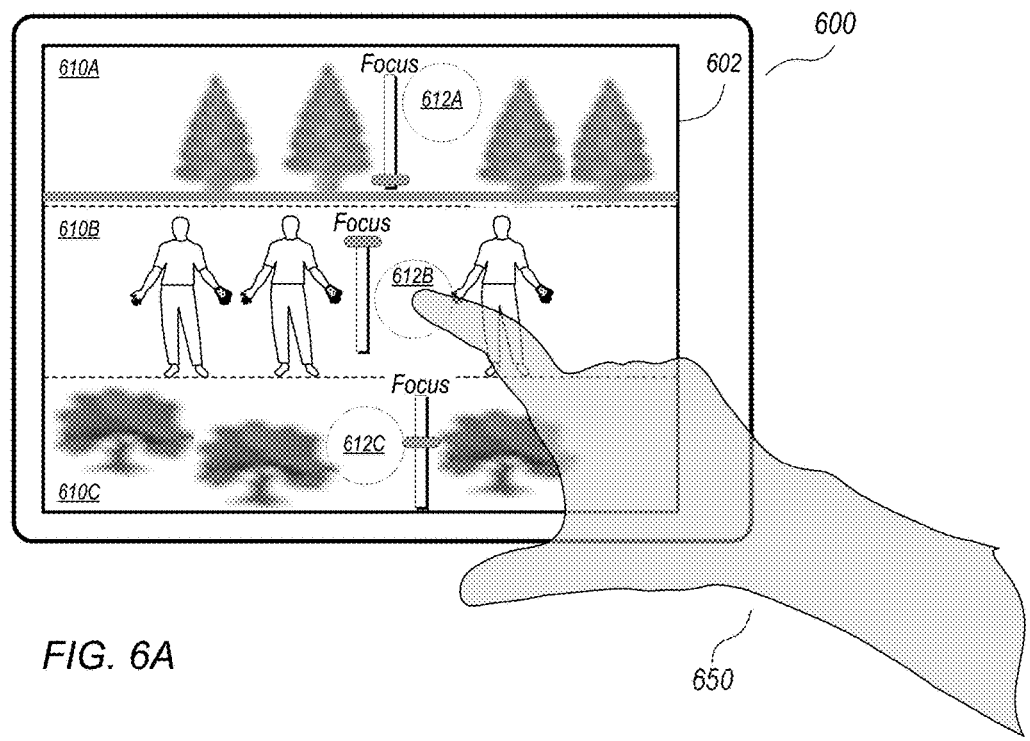
FIGS. 6A and 6B illustrate an example user interface for selecting different focus levels to be applied to different regions of an image during image capture, according to some embodiments.
Figure 6B:
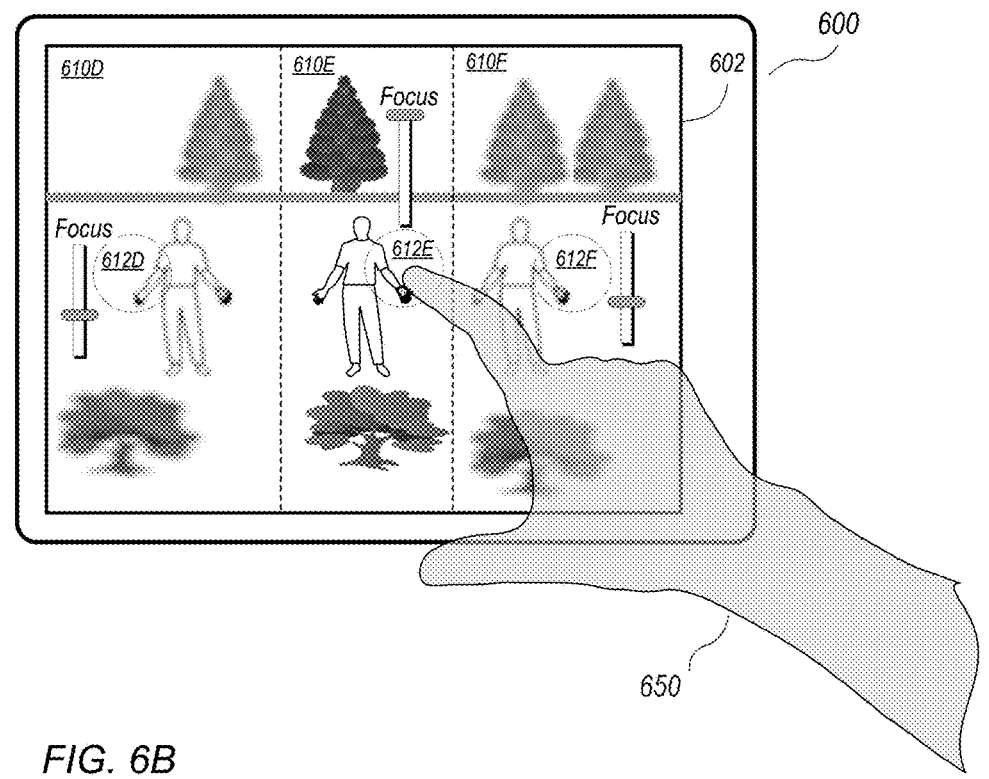

FIGS. 6A and 6B illustrate an example user interface for selecting different focus levels to be applied to different regions of an image during image capture, according to some embodiments. FIGS. 6A and 6B show a device 600 such as a smartphone or tablet that includes a touch-enabled screen and at least one camera, for example a camera module or system as illustrated in FIG. 1A, 1B, or 2. An interface 602 may be provided on the screen, for example by a camera application on the device 600. The interface 602 may show a preview of a subject field or scene in front of the camera.

FIG. 6A illustrates selecting different focus levels for horizontal regions 610A-610C of an image, for example as illustrated in FIGS. 3A and 3B. The interface 602 may allow a user 650 to use one or more touch gestures on the screen at different locations 612A through 612C to set different focus levels for respective horizontal regions 610A through 610C. In this example, the user 650 has set region 610B (the subject of the photograph to be captured) to be in focus (e.g., to a highest level of focus), region 610A (the background) to be out of focus (e.g., to a lowest level of focus), and region 610A (the foreground) to be at a middle level of focus. As shown in FIG. 6A, one or more visual indications of the focus level may be provided, for example by a slider bar or other interface element on the screen and/or by focusing or defocusing the respective regions 610 of the displayed preview. In some embodiments, the screen may be a pressure-enabled touch screen on which pressure level and duration of touch gestures may be measured, and the user 650 may move the level of focus up or down by touching the screen and applying more or less pressure for different amounts of time. During the scan process to capture the image projected on the photosensor, the lens system may be moved to different positions on the Z axis to capture the different horizontal regions 610 of the image at the different focus levels as specified by the user 650 via the interface 602.

FIG. 6B illustrates selecting different focus levels for vertical regions 610D-610F of an image, for example as illustrated in FIG. 3C. The interface 602 may allow a user 650 to use one or more touch gestures on the screen at different locations 612D through 612F to set different focus levels for respective vertical regions 610D through 610F. In this example, the user 650 has set region 610E (the subject of the photograph to be captured) to be in focus (e.g., to a highest level of focus), and has set regions 610D and 610E to be out of focus. During the scan process to capture the image projected on the photosensor, the lens system may be moved to different positions on the Z axis to capture the different vertical regions 610 of the image at the different focus levels as specified by the user 650 via the interface 602.

Figure 7:
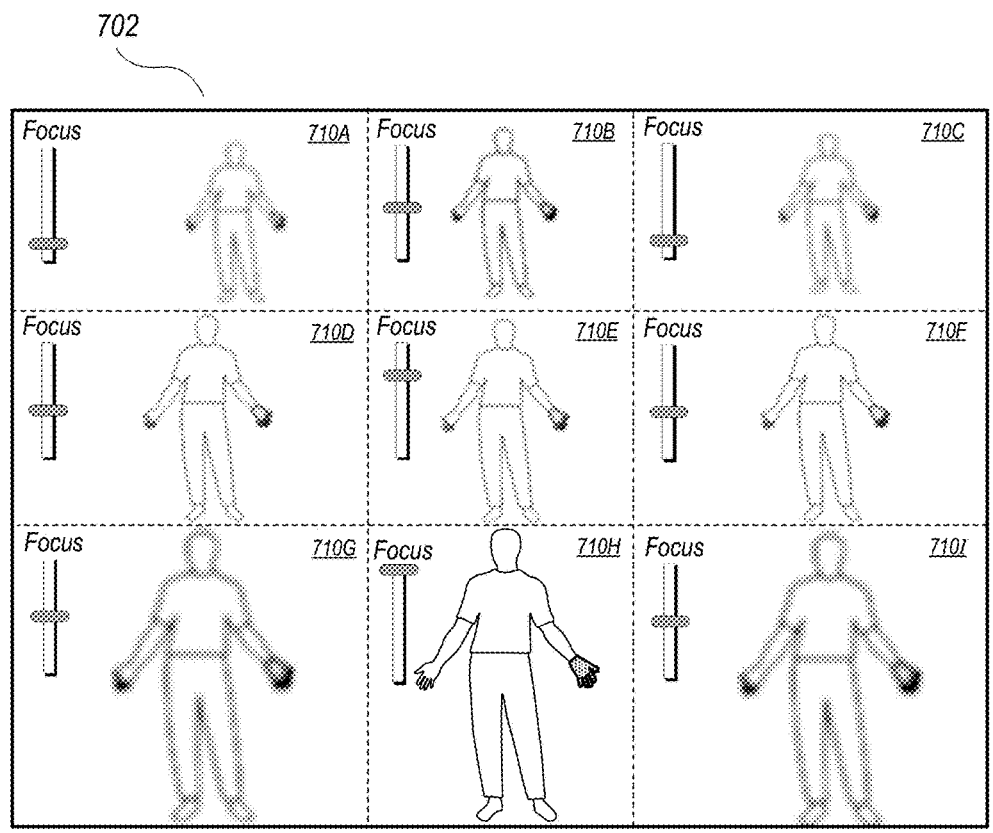
FIG. 7 illustrates setting different focus levels to be applied to different regions of an image during image capture, according to some embodiments.

While FIG. 6A shows capturing horizontal regions of an image using a top-to-bottom scan pattern and FIG. 6B shows capturing vertical regions of an image using a left-to-right scan pattern, other scan patterns may be used, and other arrangements of regions may be captured at different focus levels according to user input to the interface. For example, FIG. 7 illustrates setting different focus levels to be applied to different regions 710A-710I of an image arranged in rows and columns during image capture, according to some embodiments. The photosensor may be configured to read pixels in other patterns than the top-to-bottom or left-to right pattern. For example, the photosensor may read pixels from regions 710A-710I arranged in a grid as shown in FIG. 7 in order from region 710A to region 710I, or in a spiral pattern beginning at the center of the photosensor and going outwards. The interface 702 may allow a user to use one or more touch gestures on the screen at different locations 712A through 712I to set different focus levels for respective regions 710A through 710I. In this example, the user has set region 710H to be in focus, and has set regions 710A through 710G and 710I to be out of focus at different levels, with regions 710A and 710C being the most out of focus. During the scan process to capture the image projected on the photosensor, the lens system may be moved to different positions on the Z axis to capture the different regions 710 of the image at the different focus levels as specified by the user via the interface 702.

Figure 8A:
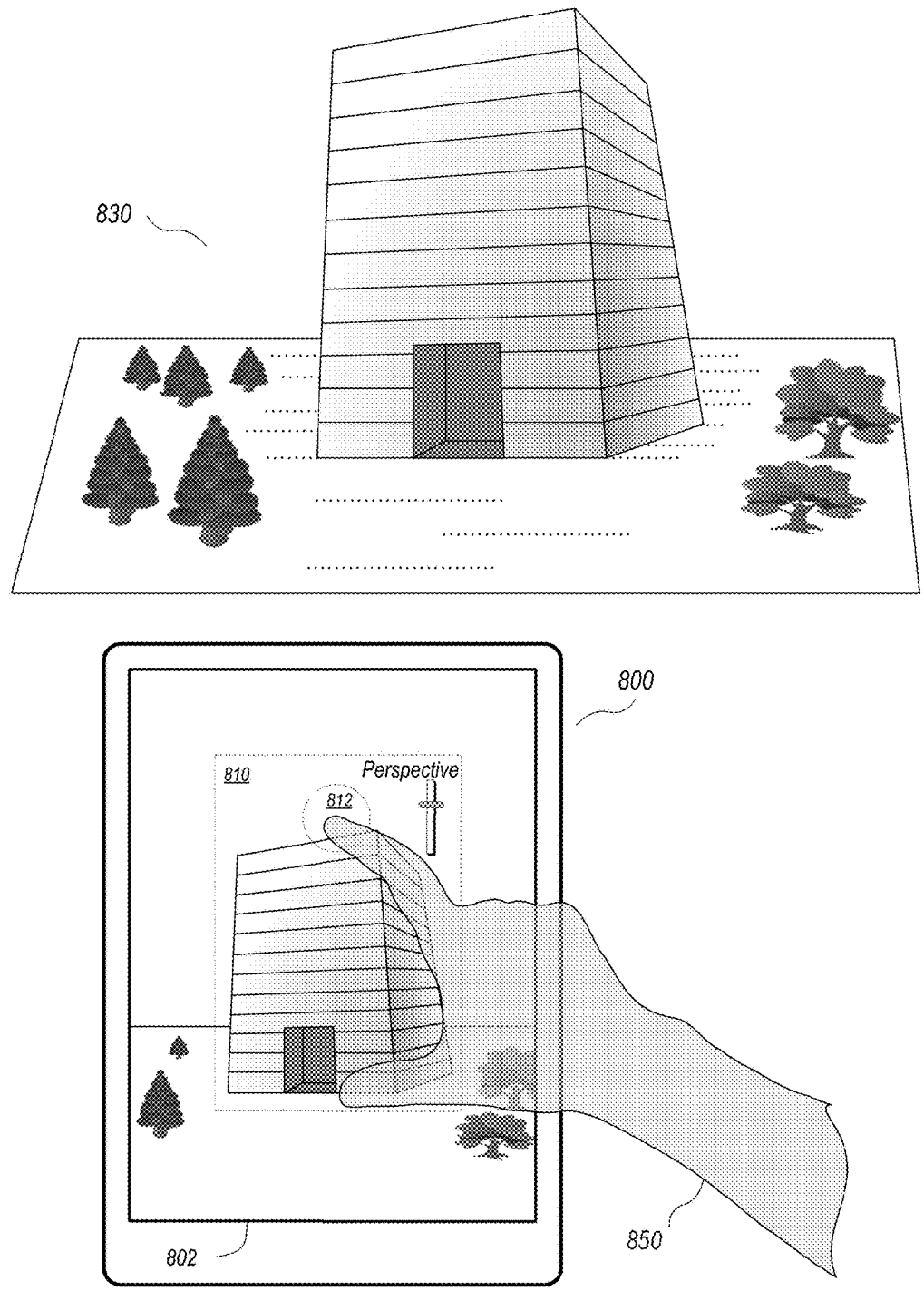
FIGS. 8A and 8B illustrate an example user interface for adjusting perspective for a vertical object in a region of a subject field to be captured, according to some embodiments.
Figure 8B:
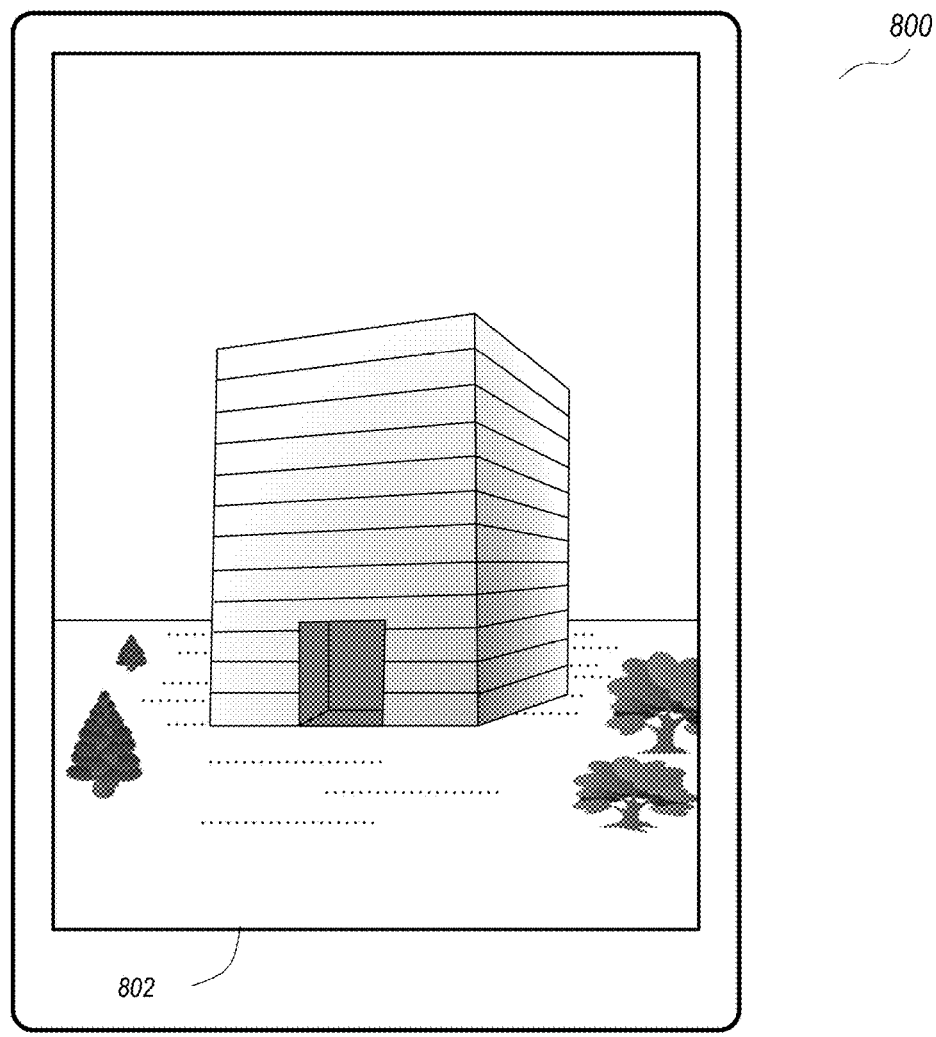

FIGS. 8A and 8B illustrate an example user interface for adjusting perspective for a vertical object in a region of a subject field to be captured using a camera system as illustrated in FIG. 1A, 1B, or 2, according to some embodiments. FIGS. 8A and 8B show a device 800 such as a smartphone or tablet that includes a touch-enabled screen and at least one camera, for example a camera module or system as illustrated in FIG. 1A, 1B, or 2. An interface 802 may be provided on the screen, for example by a camera application on the device 800. The interface 802 may show a preview of a subject field 830 in front of the camera. In this example, the user 850 is standing on the ground, some distance away from a tall building in the subject field 830. At the viewing angle of the user 850, the building appears distorted as shown in subject field 830 and in the preview of the image shown in the interface 802 on the device 800.

The perspective of an object in an image captured using a camera system as described herein may be adjusted, for example by tilting the lens system for one or more regions of the image containing the object during image capture as illustrated in FIGS. 4A through 4C. Adjusting the perspective may remove at least some of the distortion in the captured image. For example, the interface 802 may allow user 850 to use one or more touch gestures on the screen at one or more locations 812 to adjust the vertical perspective of a region 810 that contains the building. In this example, the user 850 is adjusting the perspective of region 810 that contains the building so that the perspective of the building will be corrected in the image capture. As shown in FIG. 8A, one or more visual indications of the perspective adjustment may be provided, for example by a slider bar or other interface element on the screen that indicates the level of adjustment and/or by adjusting the perspective for the respective region 810 in the displayed preview. In some embodiments, the screen may be a pressure-enabled touch screen on which pressure level and duration of touch gestures may be measured, and the user 850 may adjust the level of perspective adjustment by touching the screen and applying more or less pressure for different amounts of time. During the scan process to capture the image projected on the photosensor, the lens system may be tilted relative to the Z axis as shown in FIGS. 4A through 4C to capture region 810 of the image at the perspective adjustment level as specified by the user 850 via the interface 802. FIG. 8B shows the captured image displayed on the interface 802; note that the distortion of the building that was present in the preview of FIG. 8A has been reduced or removed by tilting the lens system when capturing the region 810.

Figure 9A:
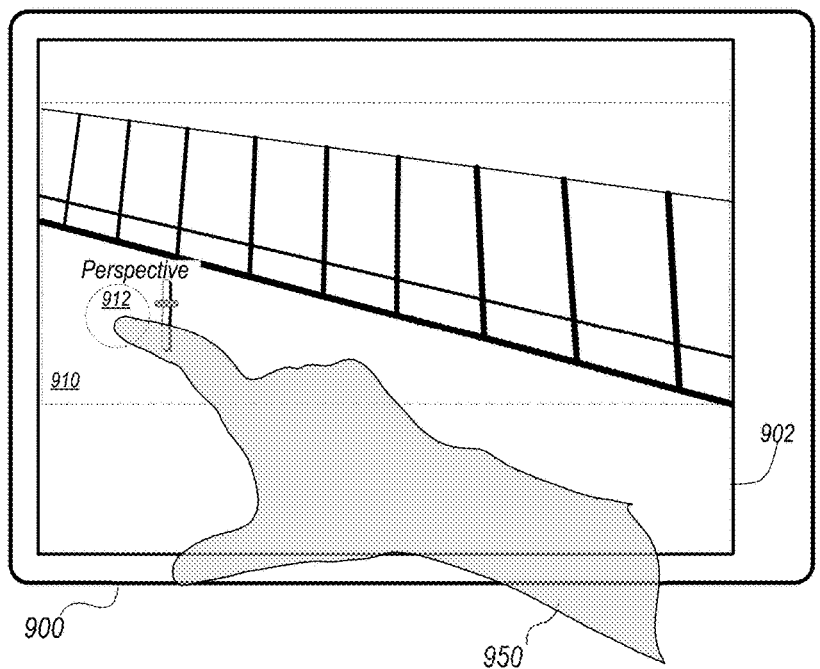
FIGS. 9A and 9B illustrate an example user interface for adjusting perspective for a horizontal object in a region of a subject field to be captured, according to some embodiments.
Figure 9B:
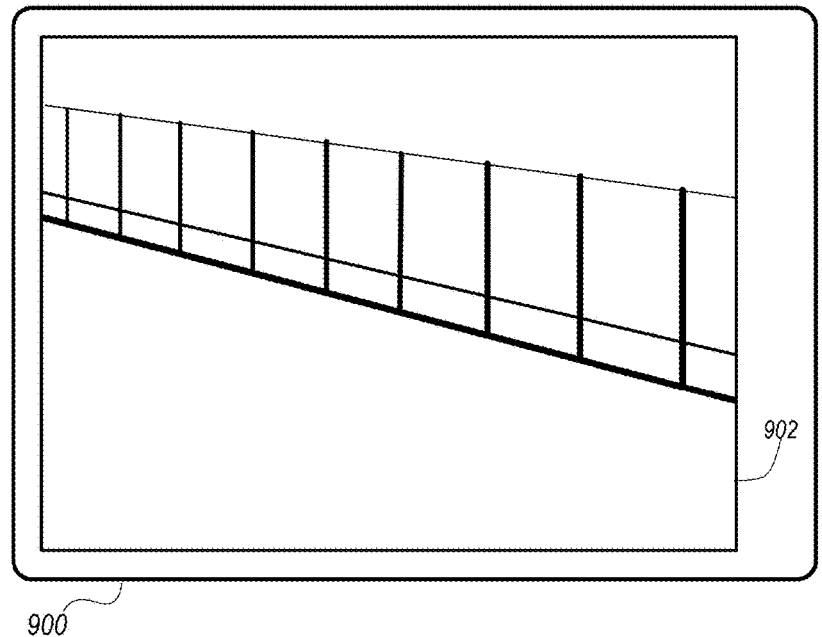

FIGS. 9A and 9B illustrate an example user interface for adjusting perspective for a horizontal object in a region of a subject field to be captured using a camera system as illustrated in FIG. 1A, 1B, or 2, according to some embodiments. FIGS. 9A and 9B show a device 900 such as a smartphone or tablet that includes a touch-enabled screen and at least one camera, for example a camera module or system as illustrated in FIG. 1A, 1B, or 2. An interface 902 may be provided on the screen, for example by a camera application on the device 900. The interface 902 may show a preview of a subject field in front of the camera. In this example, the user 950 is standing on the ground, some distance away from a vertical object (e.g., a line of light posts or fence posts) in the subject field. At the viewing angle of the user 950, the posts at the center of the preview image and appear more vertical, while the posts closer to or farther away from the camera and thus nearer to the edge of the image appear tilted or distorted.

The perspective of an object in an image captured using a camera system as described herein may be adjusted, for example by tilting the lens system for one or more regions of the image containing the object during image capture as illustrated in FIGS. 4A through 4C. Adjusting the perspective may remove at least some of the distortion in the captured image. For example, the interface 902 may allow user 950 to use one or more touch gestures on the screen at one or more locations 912 to adjust the horizontal perspective of a region 910 that contains the line of poles. In this example, the user 950 is adjusting the perspective of region 910 that contains the line of poles so that the perspective of the poles at the edges of the image can be corrected during the image capture by appropriately tilting the lens system when reading pixels from different regions of the photosensor, thus making the poles near the edges appear more upright in the captured image. During the scan process to capture the image projected on the photosensor, the lens system may be tilted relative to the Z axis as shown in FIGS. 4A through 4C to capture region 910 of the image at the perspective adjustment level as specified by the user 950 via the interface 902. FIG. 9B shows the captured image displayed on the interface 902; note that the distortion of the poles near the edge of the image frame that was present in the preview of FIG. 9A has been reduced or removed by appropriately tilting the lens system when capturing the region 910.

FIGS. 8A and 8B show an example where vertical perspective of a tall object in a subject field such as a building is adjusted, and FIGS. 9A and 9B show an example where horizontal perspective of an object (e.g., a fence line) is adjusted. However, perspective adjustment may be applied when capturing images of other objects in other orientations. As just one example, perspective adjustment may be applied to an image of a check or other piece of paper that is laid on a table or other flat surface and photographed from above.

FIG. 10 is a flowchart of a method for adjusting a lens system when capturing images of subject fields to achieve different optical effects in different regions of the captured images, according to some embodiments. The method of FIG. 10 may, for example, be implemented in a camera system or module as illustrated in FIG. 1A, 1B, or 2.

As indicated at 1000 of FIG. 10, a controller component may obtain optical settings for two or more regions of a subject field to be captured. The controller component may, for example, be implemented at least in part as or by one or more processors. In some embodiments, the processor(s) may be programmed with software and/or firmware to provide control functions for an actuator component of the camera module as described herein. The controller component may be a component of the camera module, a component of an actuator used in the camera module to move or otherwise adjust the lens system, or a separate component, for example one or more processors mounted on or integrated with a substrate in a device that includes the camera module. For a given region, the optical settings may specify one or more of a location on the optical (Z) axis for the lens system, tilt of the lens system relative to the optical axis, or shift of the lens system on one or more axes orthogonal to the optical axis.

The optical settings may be obtained from one or more sources. For example, in some embodiments, an interface may be provided on a device (e.g., a mobile device) in which the camera module is integrated via which a user may specify particular parts of the image to be in focus, focus range for the specified areas, different perspectives for different parts of the image, and so on. FIGS. 6A, 6B, 8A, 8B, 9A, and 9B illustrate example interfaces for specifying different optical settings for different regions of an image, according to some embodiments.

As another example, in some embodiments, instead of or in addition to the interface for specifying optical settings for two or more regions of an image to be captured, the controller may obtain autofocus information from the camera (e.g., autofocus pixels from an image preview), and may analyze the autofocus information to generate the optical settings for the two or more regions. FIG. 11 illustrates using information derived from focus pixels to generate optical settings for different regions of an image to be captured, according to some embodiments.

As another example, in some embodiments, the controller may instead or also obtain camera position information from an accelerometer or similar technology of the device, and may analyze the accelerometer information to generate the optical settings for the two or more regions. FIG. 12 illustrates using accelerometer information to generate optical settings for different regions of an image to be captured, according to some embodiments.

As indicated at 1002 of FIG. 10, the controller component may initialize or set the lens system according to the optical settings for a first region of a pattern to be captured. For example, as illustrated in FIG. 3A, the controller component may direct the actuator component of the camera module to move or otherwise adjust the lens system according to the settings obtained for region 302A. The optical settings for the first region may specify one or more of a location on the optical (Z) axis for the lens system, tilt of the lens system relative to the optical axis, or shift of the lens system on one or more axes orthogonal to the optical axis.

As indicated at 1004 of FIG. 10, pixel values may be read from the first region of the sensor. The sensor may be configured to capture images of scenes or subject fields in front of the camera system refracted through the lens system using line scan imaging technology or other scanning technologies (e.g., area scan), for example a CMOS image sensor using "rolling shutter" technology that reads lines of pixels from top to bottom of the sensor, or a CCD image sensor that incorporates scan technology. In some embodiments, other scan patterns than top to bottom may be provided by the sensor technology, for example a left to right pattern, diagonal patterns, or spiral patterns from the center to the outer edges of the center of the sensor. FIGS. 3A through 3C illustrate an example photosensor that uses scanning technology to capture images.

As indicated at 1006 of FIG. 10, the controller component may adjust the lens system according to the optical settings for a next region to be captured. As shown in FIG. 3A, when the last line in a current region has been read, the controller component may direct an actuator component to set the lens system to the optical setting for the next region before the read process begins for the region. As indicated at 1008 of FIG. 10, the pixel values may be read from the next region of the sensor according to the scanning technology implemented by the sensor.

At 1010 of FIG. 10, after the pixels for the current region are read, if there are more regions of the sensor to be scanned in the pattern to capture the image, then the method may return to element 1006. Otherwise, the image capture is complete. Once the image capture is complete, the image may be viewed, stored, or otherwise processed. Thus, different focus, depth of field, perspective, and other effects may be dynamically achieved during image capture at different areas or regions of the image being captured according to the optical settings for the regions that were obtained by the controller component.

Focus Pixels

FIG. 11 illustrates using information derived from focus pixels to achieve different optical effects at different regions of an image during image capture, according to some embodiments. In some embodiments, an image sensor may generate patterned defect pixels for images captured at the image sensor. Patterned defect pixels may include special pixels such as focus pixels used to detect phase difference for auto focus when an autofocus mechanism of the camera is employed. Patterned defect pixels are partially blocked or shielded at the image sensor, and thus less light is collected at these pixels during exposure. Thus, the patterned defect pixels tend to be darker than their normal neighbor pixels.

FIG. 11 provides a non-limiting example of focus pixels 1102 in an image frame 1100 captured by an image sensor, according to some embodiments. Focus pixels 1102 may include groups 1104 of special pixels with known locations within the image frame 1100, with the known locations of the pixels defined by parameters such as group start X and Y, group interval X and Y, and num groups X and Y, as well as parameters defining pixel numbers and locations within the groups 1104. In some embodiments, a group 1104 of focus pixels consists of two sets of partially blocked pixels. For focus pixels on a horizontal line, one set of focus pixels have their left side shielded and the other set right side shielded. Horizontal focus pixels may, for example, be used to detect focus on vertical edges. For focus pixels on a vertical line, one set of focus pixels have their top side shielded and the other set bottom side shielded. Vertical focus pixels may, for example, be used for detecting focus on horizontal edges. A group of horizontal left and right focus pixels can be placed on two adjacent rows. Similarly, a group of vertical top and bottom focus pixels can be placed on two adjacent columns. In some embodiments, focus pixels 1102 are placed periodically throughout the image sensor array on green pixels only (e.g., on (Gr, Gb) pixels in Bayer format). Focus pixels 1102 can be locally dense and globally sparse, or locally sparse and globally dense.

As shown in FIG. 11, in some embodiments, an autofocus mechanism 1160 of the camera module may obtain autofocus pixel information 1110A from the image frame 1100 of a preview image and provide the autofocus pixel information 1110B to a controller 1180 component. The controller 1180 component may analyze the autofocus pixel information 1110B from image frame 1100 to generate optical settings 1112 (e.g., focus, tilt, or shift settings) for two or more regions of the image frame 1100. The optical settings 1112 may be provided to the actuator 1104 component during capture of an image to adjust 1114 focus, tilt, and/or shift of the lens system 1102 for respective regions of the image during image capture by the photosensor 1150.

Actuator Data

FIG. 12 illustrates using accelerometer information to achieve different optical effects at different regions of an image during image capture, according to some embodiments. In some embodiments, the controller 1280 component may obtain device or camera position information 1210 from an accelerometer 1270 or other technology (e.g., global positioning system (GPS) technology, infrared sensor technology, etc.) of a device 1200 that includes the camera, and may analyze the position information 1210 to generate optical settings 1212 (e.g., focus, tilt, or shift settings) for two or more regions of the image frame 1100. The optical settings 1212 may be provided to the actuator 1204 component during capture of an image to adjust 1214 focus, tilt, and/or shift of the lens system 1202 for respective regions of the image during image capture by the photosensor 1250.

Example Computing Device

Figure 13:
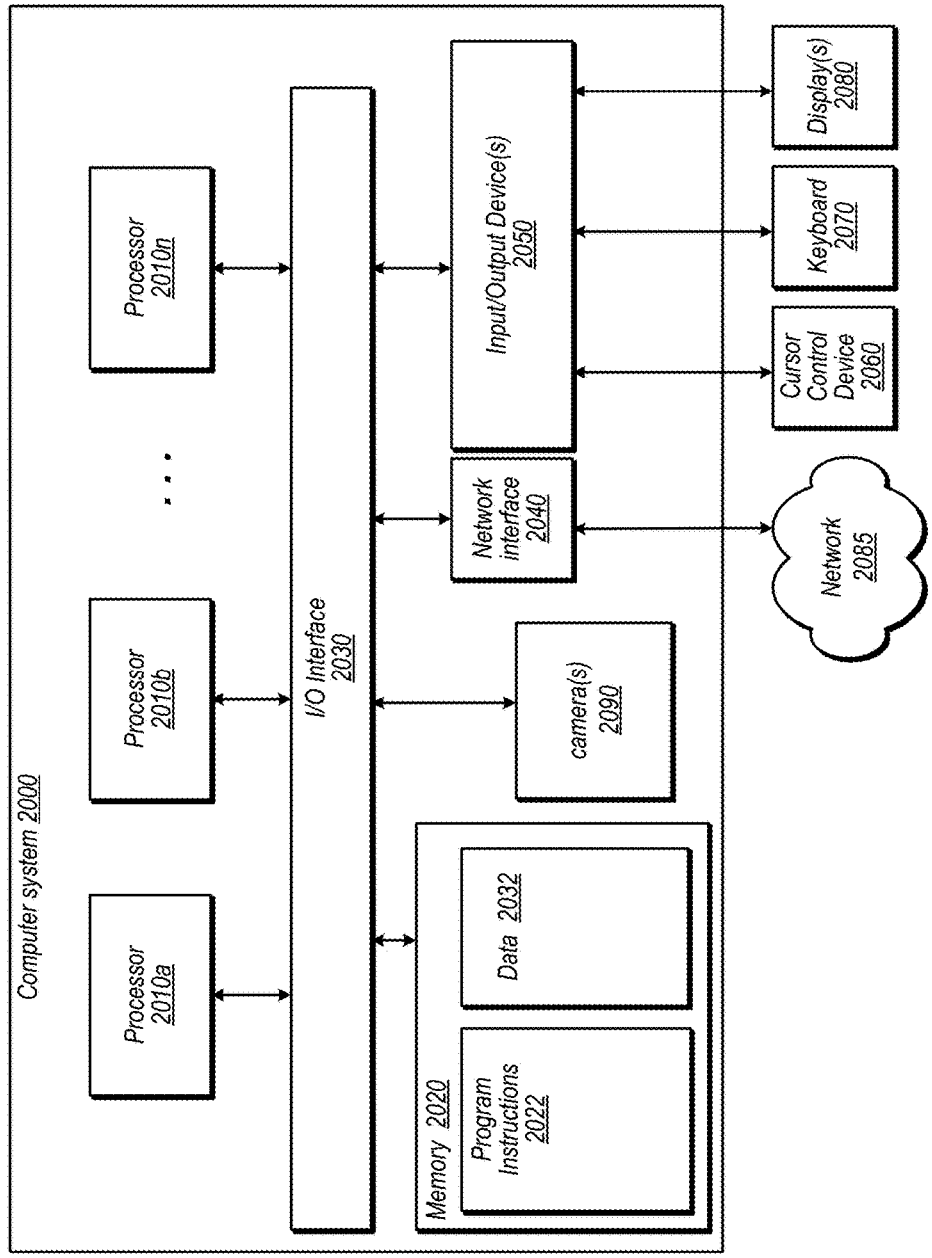
FIG. 13 illustrates an example computer system that may be used in embodiments.

FIG. 13 illustrates an example computing device, referred to as computer system 2000, that may include or host embodiments of camera modules as illustrated in FIGS. 1A through 12. In addition, computer system 2000 may implement methods for controlling operations of the camera and/or for performing image processing of images captured with the camera. In different embodiments, computer system 2000 may be any of various types of devices, including, but not limited to, a personal computer system, desktop computer, laptop, notebook, tablet or pad device, slate, or netbook computer, mainframe computer system, handheld computer, workstation, network computer, a camera, a set top box, a mobile device, a wireless phone, a smartphone, a consumer device, video game console, handheld video game device, application server, storage device, a television, a video recording device, a peripheral device such as a switch, modem, router, or in general any type of computing or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Computer system 2000 may also include one or more cameras 2090, for example one or more camera modules as described above with respect to FIGS. 1A through 12, which may also be coupled to I/O interface 2030, or one or more cameras as described above with respect FIGS. 1A through 12 along with one or more other types of cameras.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store program instructions 2022 and/or data 2032 accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions 2022 may be configured to implement various interfaces, methods and/or data for controlling operations of camera 2090 as described with respect to FIGS. 1A through 12, or other methods or data, for example interfaces and methods for displaying, processing, and storing images captured with camera 2090. In some embodiments, program instructions and/or data may be received, sent or stored upon different types of computer-accessible media or on similar media separate from system memory 2020 or computer system 2000.

In one embodiment, I/O interface 2030 may be configured to coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices attached to a network 2085 (e.g., carrier or agent devices) or between nodes of computer system 2000. Network 2085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or accessing data by computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 13, memory 2020 may include program instructions 2022, which may be processor-executable to implement any element or action to support camera 2090, including but not limited to image processing software and interface software for controlling camera 2090. In some embodiments, images captured by camera 2090 may be stored to memory 2020. In addition, metadata for images captured by camera 2090 may be stored to memory 2020.

Those skilled in the art will appreciate that computer system 2000 is merely illustrative and is not intended to limit the scope of embodiments. In particular, the computer system and devices may include any combination of hardware or software that can perform the indicated functions, including computers, network devices, Internet appliances, PDAs, wireless phones, pagers, video or still cameras, etc. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system 2000 via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:
1. An apparatus, comprising:
 a photosensor configured to capture light projected onto a surface of the photosensor using a scan technology that reads lines or areas of pixels on the photosensor according to a scan pattern;

a lens system comprising a flexible lens, wherein the lens system is configured to refract light from a subject field located in front of a camera to form an image of a scene at an image plane at or near the surface of the photosensor;

an actuator component configured to adjust a shape of the flexible lens to change optical characteristics of the image formed at the image plane; and a controller component configured to dynamically direct adjustment of the shape of the flexible lens by the actuator component as lines or areas of the photosensor are scanned according to the scan pattern so that different parts of the image are captured according to different optical characteristics.

2. The apparatus as recited in claim 1, wherein the optical characteristics include one or more of depth of field or perspective.

3. The apparatus as recited in claim 1, wherein the optical characteristics include focus, and wherein adjustment of the shape of the flexible lens further includes changing focus of the lens system.

4. The apparatus as recited in claim 1, further comprising an interface configured to receive input specifying particular parts of the image to be captured according to specified optical characteristics, wherein the controller component is configured to direct adjustment of the lens system by the actuator component according to the input.

5. The apparatus as recited in claim 1, further comprising an accelerometer, wherein the controller component is configured to direct adjustment of the lens system by the actuator component according to orientation of the apparatus with respect to a horizontal or vertical plane as detected by the accelerometer.

6. The apparatus as recited in claim 1, wherein the controller component is configured to direct adjustment of the lens system by the actuator component according to orientation of the apparatus with respect to a subject field as detected by analysis of autofocus pixel information from groups of focus pixels at known locations in a preview image of the subject field, wherein the focus pixels are partially blocked at the photosensor.

7. The apparatus as recited in claim 1, wherein the actuator component is an optical actuator, wherein, to adjust the lens system, the actuator component is configured to adjust optical characteristics of one or more optical elements of the lens system.

8. The apparatus as recited in claim 7, wherein the flexible lens comprises a flexible membrane and a fluid within a cavity beneath the flexible membrane;

wherein to adjust optical characteristics of one or more optical elements of the lens system, the optical actuator is configured to add or remove fluid from the cavity to change the shape of the flexible lens.

9. A method, comprising:

obtaining optical settings for a plurality of regions of an image to be captured by a photosensor of a camera, wherein the photosensor is configured to capture the plurality of regions of the image in a sequence according to a scan pattern; and capturing the image according to the optical settings for the plurality of regions, wherein said capturing comprises, for each region of the image as the regions on the photosensor are scanned according to the scan pattern:

adjusting, by an actuator component, a shape of a flexible lens of a lens system of the camera according to the optical settings; and reading pixel values from the corresponding region on the photosensor;

wherein adjusting the shape of the flexible lens according to the optical settings for the regions causes at least two of the regions of the image to be captured according to different optical characteristics.

10. The method as recited in claim 9, wherein the optical settings are obtained from a controller component that controls adjustment of the lens system by the actuator component, and wherein the optical characteristics include one or more of depth of field or perspective.

11. The method as recited in claim 9, wherein the optical characteristics include focus.

12. The method as recited in claim 9, wherein adjusting the shape of the flexible lens according to the optical settings comprises one or more of changing focus of the lens system or tilting the flexible lens with respect to an optical axis of the camera.

13. The method as recited in claim 9, wherein the optical settings are obtained from an interface that receives input specifying the optical settings for the plurality of regions of the image, wherein the interface is a touch-enabled screen of a device that includes the camera, and wherein the input includes touch gesture input to the interface specifying the optical settings for at least one of the plurality of regions of the image.

14. The method as recited in claim 9, wherein obtaining the optical settings for the plurality of regions of the image comprises:

obtaining position information for the camera with respect to a subject field to be captured in the image; and determining the optical settings for at least one of the plurality of regions of the image according to orientation of the camera with respect to the subject field as detected by analysis of the position information.

15. The method as recited in claim 9, wherein obtaining the optical settings for the plurality of regions of the image comprises:

obtaining autofocus pixel information from groups of focus pixels at known locations in a preview image of a subject field, wherein the focus pixels are partially blocked at the photosensor; and determining the optical settings for at least one of the plurality of regions of the image according to orientation of the camera with respect to the subject field as detected by analysis of the autofocus pixel information.

16. The method as recited in claim 9, wherein the actuator component is an optical actuator, and wherein adjusting the shape of the flexible lens is performed while the lens system remains fixed in relation to the photosensor in the camera.

17. The method as recited in claim 9, wherein the flexible lens comprises a flexible membrane and a fluid within a cavity beneath the flexible membrane;

wherein adjusting the shape of the flexible lens comprises adding or removing fluid from the cavity to change the shape of the flexible lens.

18. A device, comprising:

one or more processors;

one or more cameras; and a memory comprising program instructions executable by at least one of the one or more processors to control operations of the one or more cameras;

wherein at least one of the one or more cameras is a camera comprising:

a photosensor configured to capture light projected onto a surface of the photosensor using a scan technology that reads lines or areas of pixels on the photosensor according to a scan pattern;

a lens system comprising a flexible lens, wherein the lens system is configured to refract light from a subject field located in front of the camera to form an image of a scene at an image plane at or near the surface of the photosensor;

an actuator component configured to adjust a shape of the flexible lens to change optical characteristics of the image formed at the image plane as lines or areas of the photosensor are scanned according to the scan pattern so that different parts of the image are captured according to different optical characteristics.

19. The device as recited in claim 18, further comprising a controller component configured to direct adjustment of the lens system by the actuator component as the lines or areas of the photosensor are scanned according to the scan pattern.

20. The device as recited in claim 18, further comprising an interface configured to receive input specifying particular parts of the image to be captured according to specified optical characteristics, wherein the specified optical characteristics include one or more of focus, depth of field, or perspective, and wherein the actuator component is configured to adjust the lens system to change the optical characteristics of the image formed at the image plane according to the input.

* * * * *